US008837818B2

(12) United States Patent
　　　Komaki

(10) Patent No.: US 8,837,818 B2
(45) Date of Patent: Sep. 16, 2014

(54) DOCUMENT IMAGE PROCESSING APPARATUS, DOCUMENT IMAGE PROCESSING METHOD, AND COMPUTER-READABLE RECORDING MEDIUM HAVING RECORDED DOCUMENT IMAGE PROCESSING PROGRAM

(75) Inventor: Yoshio Komaki, Nishinomiya (JP)

(73) Assignee: Konica Minolta Business Technologies, Inc. (JP)

( * ) Notice: Subject to any disclaimer, the term of this patent is extended or adjusted under 35 U.S.C. 154(b) by 546 days.

(21) Appl. No.: 12/722,057

(22) Filed: Mar. 11, 2010

(65) Prior Publication Data

US 2010/0238474 A1　　Sep. 23, 2010

(30) Foreign Application Priority Data

Mar. 17, 2009　(JP) ................................. 2009-064609

(51) Int. Cl.
　　　*G06F 17/21* 　　　(2006.01)
(52) U.S. Cl.
　　　CPC .................................... *G06F 17/211* (2013.01)
　　　USPC ............ 382/159; 382/190; 382/321; 707/742
(58) Field of Classification Search
　　　CPC ............ G06F 17/2229; G06F 17/2241; G06F 17/3061; G06F 17/211; G06F 17/212; G06F 17/218; G06F 17/2247; G06F 17/2705; G06F 17/277
　　　See application file for complete search history.

(56) References Cited

U.S. PATENT DOCUMENTS

| | | | | |
|---|---|---|---|---|
| 4,813,010 A | * | 3/1989 | Okamoto et al. | 715/259 |
| 4,876,665 A | * | 10/1989 | Iwai et al. | 1/1 |
| 5,257,186 A | * | 10/1993 | Ukita et al. | 715/259 |
| 5,848,184 A | * | 12/1998 | Taylor et al. | 382/173 |
| 6,243,501 B1 | * | 6/2001 | Jamali | 382/305 |
| 6,298,357 B1 | * | 10/2001 | Wexler et al. | 715/210 |
| 6,687,404 B1 | * | 2/2004 | Hull et al. | 382/226 |
| 2002/0184188 A1 | * | 12/2002 | Mandyam et al. | 707/1 |
| 2004/0006742 A1 | * | 1/2004 | Slocombe | 715/513 |
| 2004/0146199 A1 | * | 7/2004 | Berkner et al. | 382/176 |
| 2004/0194035 A1 | * | 9/2004 | Chakraborty | 715/531 |
| 2004/0243645 A1 | * | 12/2004 | Broder et al. | 707/200 |
| 2006/0036649 A1 | * | 2/2006 | Simske et al. | 707/200 |
| 2006/0047691 A1 | * | 3/2006 | Humphreys et al. | 707/102 |

(Continued)

FOREIGN PATENT DOCUMENTS

JP　　　2000-251067 A　　　9/2000

OTHER PUBLICATIONS

Notice of Grounds for Rejection for Patent Application No. 2009-064609, mailed Feb. 19, 2013, with English translation.

*Primary Examiner* — Jacob F Bétit
*Assistant Examiner* — Kristofer Biskeborn
(74) *Attorney, Agent, or Firm* — Cantor Colburn LLP

(57) ABSTRACT

A feature section including a feature of a candidate region but not including a feature of a related large region is set as for a style type different in feature from the related large region among a plurality of style types, with respect to each index candidate region. At least one or both of the large regions and the candidate regions having the feature included in the set feature section are grouped. An index evaluation degree is calculated, based on the grouped result, with respect to each candidate region. It is determined whether or not a logical element of each candidate region is an index, based on the calculated index evaluation degree.

18 Claims, 17 Drawing Sheets

(56) References Cited

U.S. PATENT DOCUMENTS

| | | | |
|---|---|---|---|
| 2006/0155703 A1* | 7/2006 | Dejean et al. | 707/7 |
| 2006/0204096 A1* | 9/2006 | Takebe et al. | 382/180 |
| 2006/0236230 A1* | 10/2006 | Lin et al. | 715/517 |
| 2006/0271847 A1* | 11/2006 | Meunier | 715/517 |
| 2006/0294460 A1* | 12/2006 | Chao et al. | 715/520 |
| 2007/0003147 A1* | 1/2007 | Viola et al. | 382/229 |
| 2007/0053611 A1* | 3/2007 | Wnek | 382/294 |
| 2007/0196015 A1* | 8/2007 | Meunier et al. | 382/190 |
| 2007/0198912 A1* | 8/2007 | Meunier | 715/509 |
| 2008/0040660 A1* | 2/2008 | Georke et al. | 715/243 |
| 2009/0110268 A1* | 4/2009 | Dejean et al. | 382/159 |
| 2009/0144614 A1* | 6/2009 | Dresevic et al. | 715/239 |
| 2009/0192956 A1* | 7/2009 | Dejean et al. | 706/12 |

* cited by examiner

- HEADER SECTION — 402
- DOCUMENT IMAGE (PAGE 1)
- DOCUMENT IMAGE (PAGE 2)
- DOCUMENT IMAGE (PAGE 3)
- DOCUMENT IMAGE (PAGE n) — 404
- BOOKMARK DATA — 406
- FOOTER SECTION — 408

400

| PAGE NUMBER | REGION UPPER LEFT COORDINATES | REGION LOWER RIGHT COORDINATES | ELEMENT TYPE |
|---|---|---|---|
| 1 | (50,100) | (60,800) | INDEX |
| ... | ... | ... | ... |
| | | | |
| | | | |
| | | | |

FIG.8
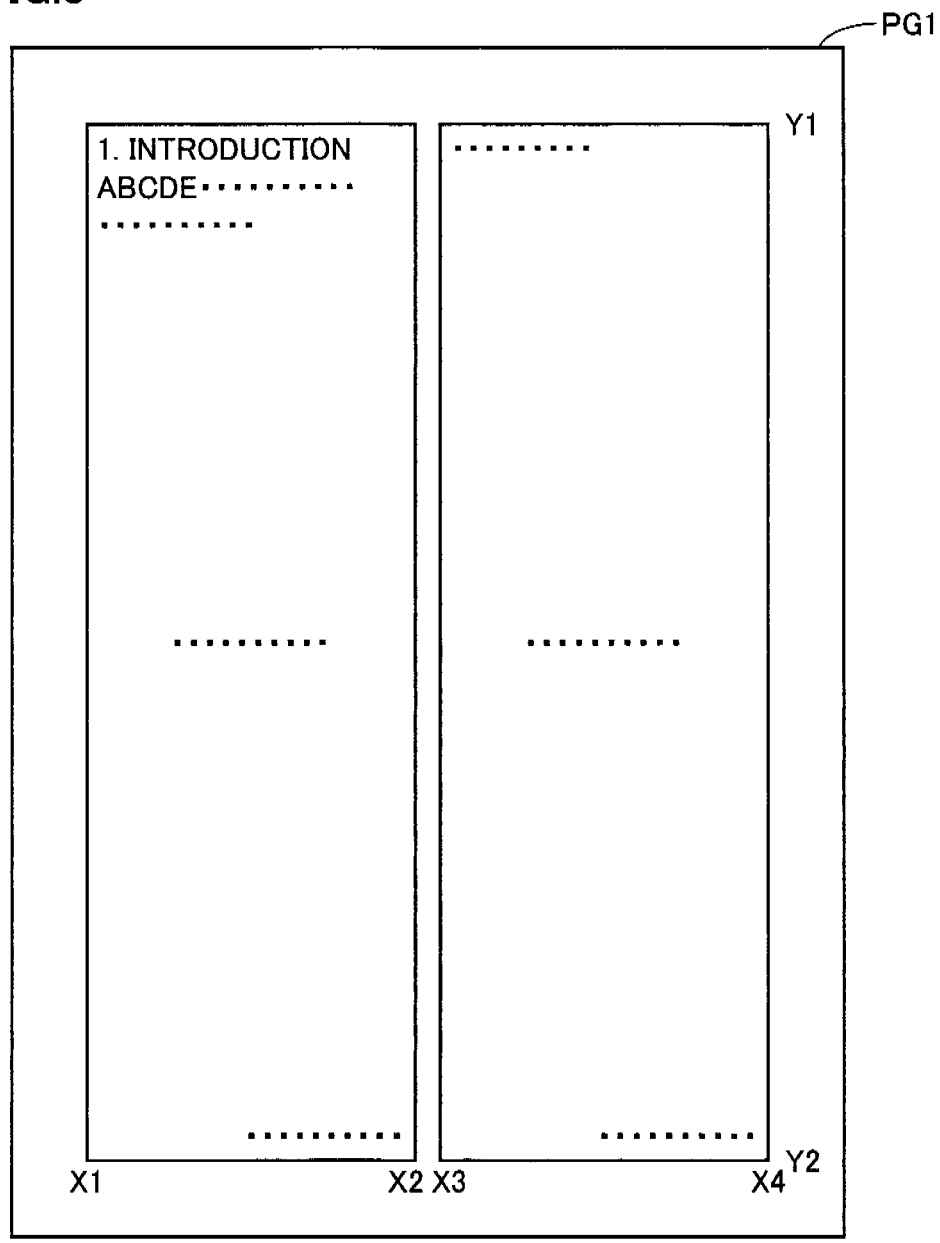
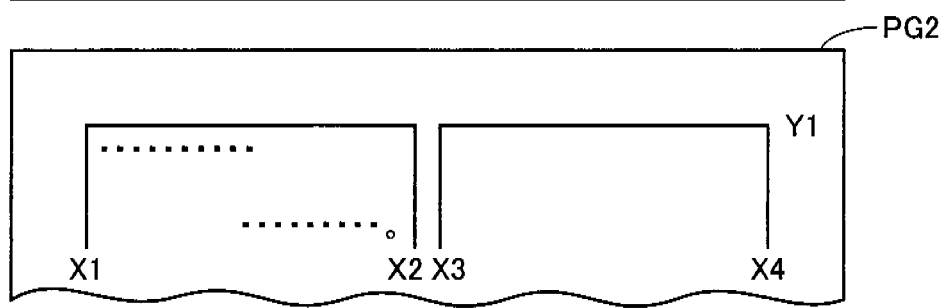

FIG.15

| ONE FOCUSED INDEX CANDIDATE REGION | RELATED FIRST TEXT REGION (RELATED LARGE REGION) | DIFFERENT FEATURE LIST (DIFFERENT STYLE TYPE) | FEATURE SECTION |
|---|---|---|---|
| CHARACTER STRING ELEMENT REGION 1 | CHARACTER STRING ELEMENT REGION 2 | HEAD CHARACTER KIND IN FIRST LINE (THREE KINDS) | NUMBER |
| CHARACTER STRING ELEMENT REGION 4 | CHARACTER STRING ELEMENT REGION 5 | (NOT EXIST) | |
| CHARACTER STRING ELEMENT REGION 6 | CHARACTER STRING ELEMENT REGION 7 | HEAD CHARACTER KIND IN FIRST LINE (THREE KINDS) | NUMBER |
| CHARACTER STRING ELEMENT REGION 9 | CHARACTER STRING ELEMENT REGION 10 | HEAD CHARACTER KIND IN FIRST LINE (THREE KINDS) | NUMBER |
| CHARACTER STRING ELEMENT REGION 12 | CHARACTER STRING ELEMENT REGION 13 | INDENT AMOUNT | INDENT OF 7 TO 8 |
| CHARACTER STRING ELEMENT REGION 15 | CHARACTER STRING ELEMENT REGION 16 | HEAD CHARACTER KIND IN FIRST LINE (THREE KINDS) | NUMBER |

FIG.16

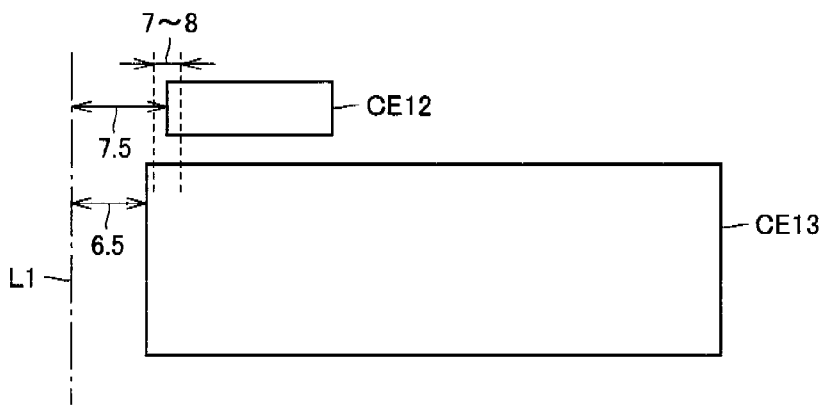

FIG.17

| ONE FOCUSED INDEX CANDIDATE REGION | RELATED FIRST TEXT REGION (RELATED LARGE REGION) | DIFFERENT FEATURE LIST (DIFFERENT STYLE TYPE) | FEATURE SECTION |
|---|---|---|---|
| CHARACTER STRING ELEMENT REGION 1 | CHARACTER STRING ELEMENT REGION 2 | HEAD CHARACTER KIND IN FIRST LINE (THREE KINDS) | NUMBER |
| | | HEAD CHARACTER KIND IN FIRST LINE (FIVE KINDS) | NUMBER |
| CHARACTER STRING ELEMENT REGION 4 | CHARACTER STRING ELEMENT REGION 5 | HEAD CHARACTER KIND IN FIRST LINE (FIVE KINDS) | KATAKANA |
| CHARACTER STRING ELEMENT REGION 6 | CHARACTER STRING ELEMENT REGION 7 | HEAD CHARACTER KIND IN FIRST LINE (THREE KINDS) | NUMBER |
| | | HEAD CHARACTER KIND IN FIRST LINE (FIVE KINDS) | NUMBER |
| CHARACTER STRING ELEMENT REGION 9 | CHARACTER STRING ELEMENT REGION 10 | HEAD CHARACTER KIND IN FIRST LINE (THREE KINDS) | NUMBER |
| | | HEAD CHARACTER KIND IN FIRST LINE (FIVE KINDS) | NUMBER |
| CHARACTER STRING ELEMENT REGION 12 | CHARACTER STRING ELEMENT REGION 13 | INDENT AMOUNT | INDENT OF 7 TO 8 |
| | | HEAD CHARACTER KIND IN FIRST LINE (FIVE KINDS) | CHINESE CHARACTER |
| CHARACTER STRING ELEMENT REGION 15 | CHARACTER STRING ELEMENT REGION 16 | HEAD CHARACTER KIND IN FIRST LINE (THREE KINDS) | NUMBER |
| | | HEAD CHARACTER KIND IN FIRST LINE (FIVE KINDS) | NUMBER |

FIG.18

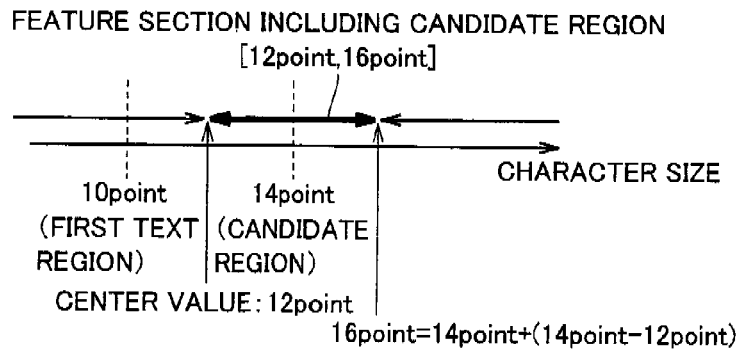

FEATURE SECTION INCLUDING CANDIDATE REGION
[12point,16point]

10point
(FIRST TEXT REGION)
CENTER VALUE: 12point

14point
(CANDIDATE REGION)

CHARACTER SIZE

16point=14point+(14point−12point)

FIG.19

| ONE FOCUSED INDEX CANDIDATE REGION | GROUP OF CHARACTER STRING ELEMENT REGION INCLUDED IN SET FEATURE SECTION | | |
|---|---|---|---|
| | GROUP OF INDEX CANDIDATE REGION | GROUP OF LARGE REGION | GROUP OF OTHER SMALL REGION |
| CHARACTER STRING ELEMENT REGION 1 | CHARACTER STRING ELEMENT REGION 6,9,15 | NOT EXIST | NOT EXIST |
| CHARACTER STRING ELEMENT REGION 4 | NOT EXIST | CHARACTER STRING ELEMENT REGION 7,16 | CHARACTER STRING ELEMENT REGION 8,17 |
| CHARACTER STRING ELEMENT REGION 6 | CHARACTER STRING ELEMENT REGION 4,9,15 | NOT EXIST | NOT EXIST |
| CHARACTER STRING ELEMENT REGION 9 | CHARACTER STRING ELEMENT REGION 4,6,15 | NOT EXIST | NOT EXIST |
| CHARACTER STRING ELEMENT REGION 12 | NOT EXIST | NOT EXIST | NOT EXIST |
| CHARACTER STRING ELEMENT REGION 15 | CHARACTER STRING ELEMENT REGION 1,4,6 | NOT EXIST | NOT EXIST |

FIG.20

| ONE FOCUSED INDEX CANDIDATE REGION | NUMBER OF CHARACTER STRING ELEMENT REGION INCLUDED IN GROUP OF CHARACTER STRING ELEMENT REGION INCLUDED IN SET FEATURE SECTION | | | | INDEX EVALUATION DEGREE | |
|---|---|---|---|---|---|---|
| | INDEX CANDIDATE REGION (IN THE SAME PAGE) | INDEX CANDIDATE REGION (IN DIFFERENT PAGE) | LARGE REGION (CONTINUOUS) | LARGE REGION (DISCONTINUOUS) | NON-INDEX DEGREE | INDEX DEGREE |
| CHARACTER STRING ELEMENT REGION 1 | 3 | 0 | 0 | 0 | 0 | 6 |
| CHARACTER STRING ELEMENT REGION 4 | 0 | 0 | 0 | 2 | 2 | 0 |
| CHARACTER STRING ELEMENT REGION 6 | 3 | 0 | 0 | 0 | 0 | 6 |
| CHARACTER STRING ELEMENT REGION 9 | 3 | 0 | 0 | 0 | 0 | 6 |
| CHARACTER STRING ELEMENT REGION 12 | 0 | 0 | 0 | 0 | 0 | 0 |
| CHARACTER STRING ELEMENT REGION 15 | 3 | 0 | 0 | 0 | 0 | 6 |

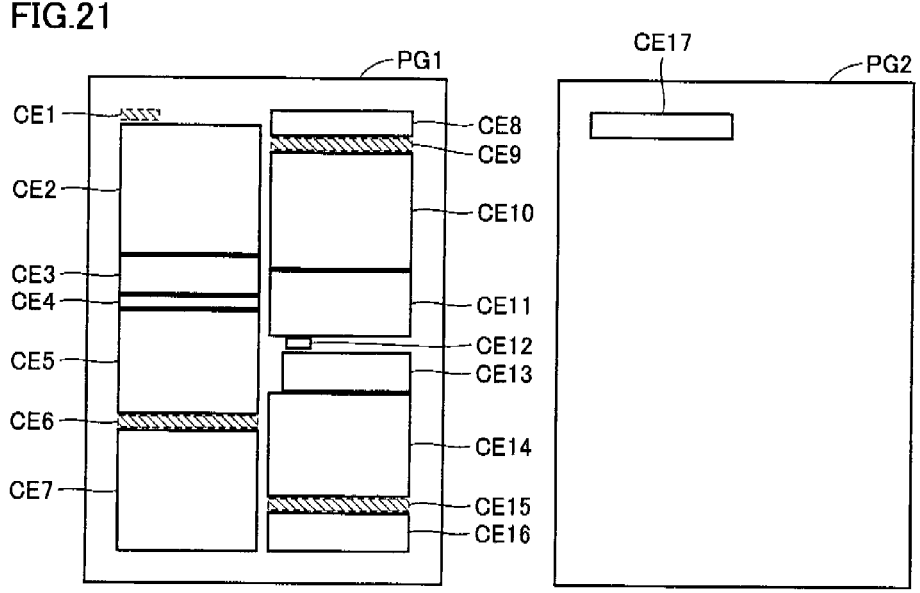

FIG.21

FIG.22A 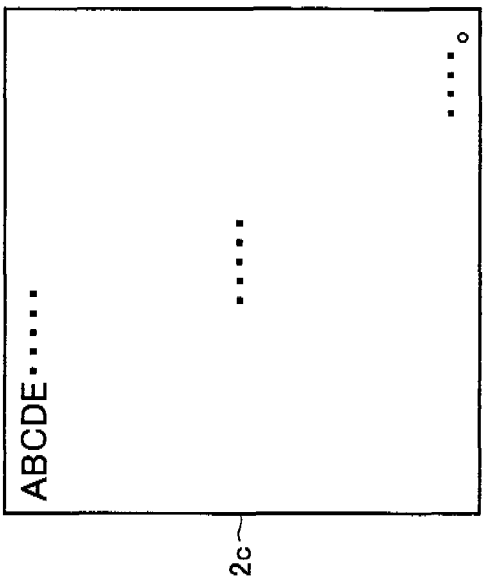 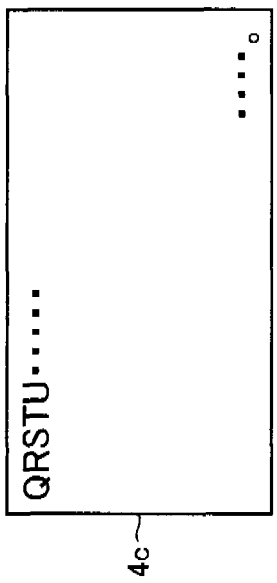
FIG.22B 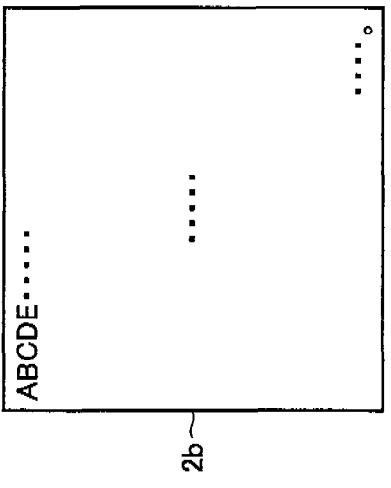 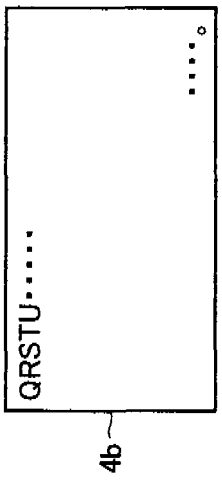
FIG.22C 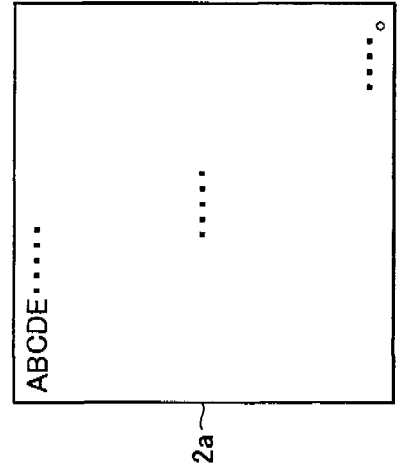 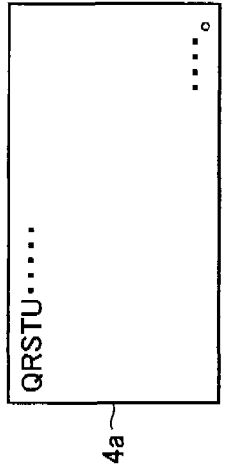

DOCUMENT IMAGE PROCESSING APPARATUS, DOCUMENT IMAGE PROCESSING METHOD, AND COMPUTER-READABLE RECORDING MEDIUM HAVING RECORDED DOCUMENT IMAGE PROCESSING PROGRAM

This application is based on Japanese Patent Application No. 2009-064609 filed with the Japan Patent Office on Mar. 17, 2009, the entire content of which is hereby incorporated by reference.

BACKGROUND OF THE INVENTION

1. Field of the Invention

The present invention relates to a document image processing apparatus, a document image processing method, and a computer-readable recording medium having a recorded document image processing program and more particularly, to a document image processing apparatus, a document image processing method, and a computer-readable recording medium having a recorded document image processing program, in which an index region can be extracted from a document image.

2. Description of the Related Art

Conventionally, there is a technique to extract an index part without being limited by a specific format. For example, Japanese Laid-Open Patent Publication No. 2000-251067 discloses an embodiment in which a character block is classified as an index and text according to a character size, and the classified index and text are related.

However, there are many documents having no definite difference in character size between the text and the index, so that such documents cannot be classified as the index and the text based on the character size.

Even when another type such as a character color, background color, and indent is used instead of the character size, each document is limited.

SUMMARY OF THE INVENTION

The present invention was made to solve the above problems and it is an object of the present invention to provide a document image processing apparatus, a document image processing method, and a computer-readable recording medium having a recorded document image processing program, in which an index region can be automatically extracted from various styles of document images without needing user handling.

A document image processing apparatus according to an aspect of the present invention includes a memory for storing a document image, and a controller for controlling extraction of index region from the document image. The controller classifies a plurality of character string element regions constituting the document image into small regions and large regions based on a difference of a feature quantity among the character string element regions. The controller also sets a feature section for each candidate region that represents a candidate of the index region among the small regions, as for a style type different in feature from a corresponding related large region that represents the large region related to the intended candidate region among a plurality of style types, the feature section including a feature of the intended candidate region but not including a feature of the corresponding related large region. In addition, the controller extracts the candidate region determined as an index based on a group size of at least one or both of the large regions and the candidate regions having the feature included in the set feature section, as the index region.

Preferably, the controller calculates an index evaluation degree based on the group size for each the candidate region, for determining whether or not the candidate region is the index.

Preferably, the controller more highly calculates the index evaluation degree as the group size of the large regions is smaller and the group size of the candidate regions is larger.

Preferably, the controller determines the candidate region as the index when the number of the large regions in the large region group is a predetermined number or less.

Preferably, the controller determines the candidate region as the index when the number of the candidate regions in the candidate region group is a predetermined number or more.

Preferably, the controller compares the indicated candidate region with the corresponding related large region and provides the feature section in the vicinity of the feature of the indicated candidate region without including the feature of the corresponding related large region.

Preferably, the controller compares the indicated candidate region and the corresponding related large region, and provides the feature section depending on whether the feature is closer to the feature of the indicated candidate region or the feature of the corresponding related large region.

Preferably, the controller further determines whether or not the index evaluation degree can be calculated, and changes the feature section when it is determined that the determination cannot be made.

Preferably, the controller adds a new style type having a different feature by comparing the indicated candidate region with the corresponding related large region, and sets a new feature section to the newly added style type, as a process of changing the feature section. The controller also executes a grouping process with a combination of the already set feature section and the newly set feature section.

Preferably, the controller classifies the plurality of character string element regions into the small regions and the large regions, based on the size of the region and based on whether or not there is a specific character, as the feature quantity among the character string element regions.

Preferably, the controller sets a reading order, and specifies the region subsequent to each the small region according to the set reading order and when the specified region is the large region, it is determined that the large region is related to the preceding small region.

Preferably, the style type includes any one of an indent amount, a justified line, distances from previous and next character string element regions, a character string decoration, a head character kind, an end character kind, a language type, a character size, a line height, a character interval, a font, a character decoration, a character color, and a background color.

Preferably, an image reader to read a manuscript to generate the document image is further provided. The controller further generates viewing navigation information for specifying a position of the extracted index region in the document image, and generates a computerized document by adding the viewing navigation information to the document image.

A document image processing method according to another aspect of the present invention is executed by a document image processing apparatus having a memory storing a document image, to extract an index region from the document image stored in the memory, and includes a step of classifying a plurality of character string element regions constituting the document image into small regions and large regions based on a difference of a feature quantity among the character string element regions, a step of setting a feature section for each candidate region that represents a candidate of the index region among the small regions, as for a style type different in feature from a corresponding related large region that represents the large region related to the intended candidate region among a plurality of style types, the feature section including a feature of the intended candidate region but not including a feature of the corresponding related large region, and a step of extracting the candidate region determined as an index based on a group size of at least one or both of the large regions and the candidate regions having the feature included in the set feature section, as the index region.

A computer-readable recording medium according to still another aspect of the present invention stores a recorded document image processing program including a step of classifying a plurality of character string element regions constituting the document image into small regions and large regions based on a difference of a feature quantity among the character string element regions, a step of setting a feature section for each candidate region that represents a candidate of the index region among the small regions, as for a style type different in feature from a corresponding related large region that represents the large region related to the intended candidate region among a plurality of style types, the feature section including a feature of the intended candidate region but not including a feature of the corresponding related large region, and a step of extracting the candidate region determined as an index based on a group size of at least one or both of the large regions and the candidate regions having the feature included in the set feature section, as a index region.

According to the present invention, the feature section is dynamically set with respect to each candidate region. Therefore, even when the feature of the index is not uniform in the document image, the index region can be extracted with high accuracy without needing user handling.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a view to describe a content region determined in step S4 in FIG. 7.

FIG. 15 is a view showing an example of a feature section set with respect to each candidate region.

FIG. 16 is a view showing a setting example of the feature section as for an indent amount.

FIG. 17 is a view showing another example of the feature section set as for each candidate region.

FIG. 18 is a view showing a setting example of the feature section as for a character size.

FIG. 19 is a view showing a grouped result of the character string element region using each feature section shown in FIG. 17.

FIG. 20 is a view showing a specific example of a method of calculating an index evaluation degree in the embodiment of the present invention.

FIG. 21 is a view showing an index determined result of the candidate region shown in FIG. 13.

FIG. 22A to 22C are views to described a conventional method of extracting an index region, and showing examples of a plurality of document styles having different character sizes.

DESCRIPTION OF THE PREFERRED EMBODIMENTS

Figure 1:
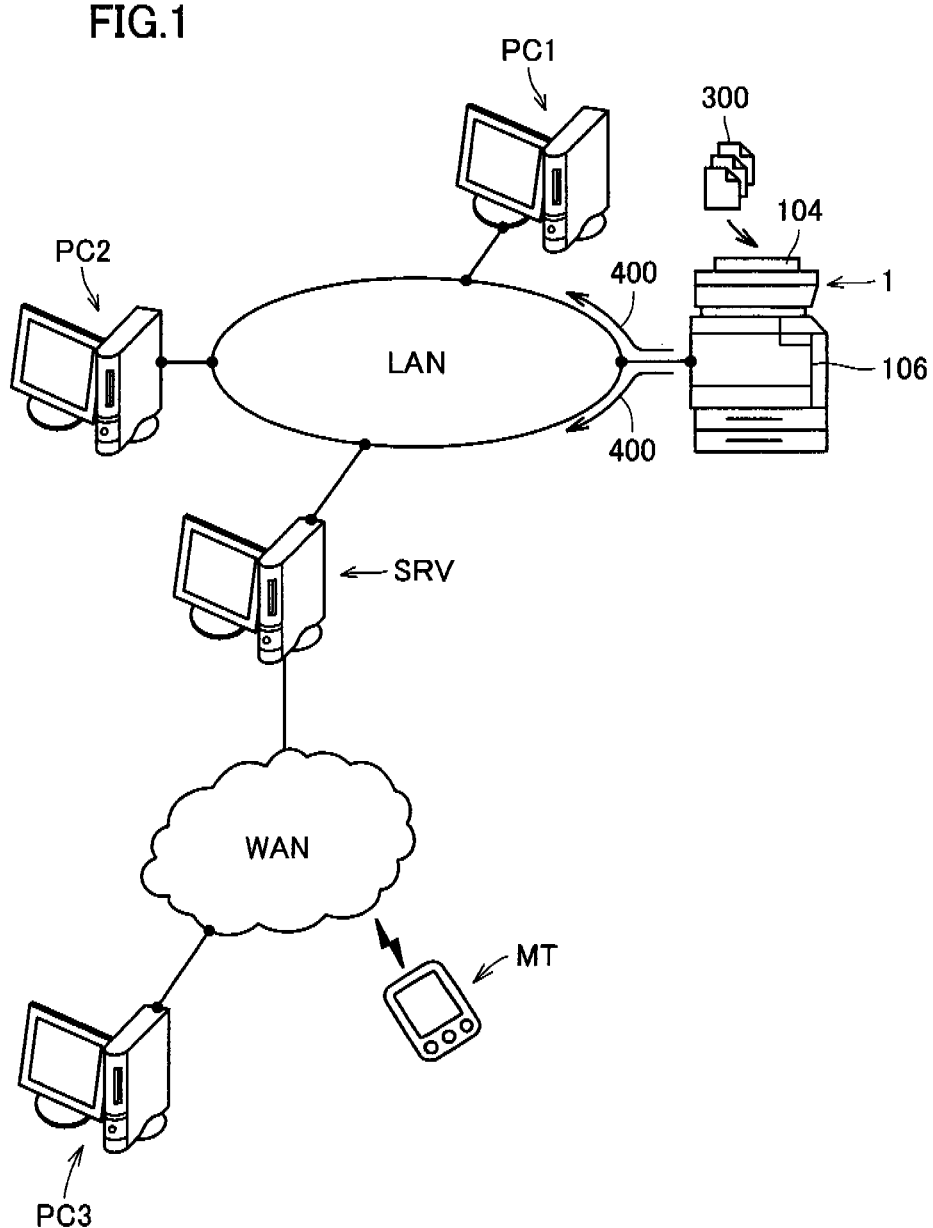
FIG. 1 is a schematic configuration view of a system including a document image processing apparatus according to an embodiment of the present invention.

An embodiment of the present invention will be described in detail with reference to the drawings. In addition, the same reference is given to the same or corresponding part and a description thereof is not repeated.

Prior to the description of the embodiment of the present invention, with reference to FIGS. 22A to 27, a description will be made of a conventionally existing typical method of extracting an index part.

Conventionally, there is a technique (referred to as "conventional example 1" hereinafter) to extract an index region (index part) by allocating an index level to a previously provided feature section. In addition, there is a technique (referred to as "conventional example 2" hereinafter) to extract the index region by grouping regions having a similar feature and then allocating an index level to the group.

FIG. 22A shows an example in which a character size in regions 1a and 3a corresponding to the index is larger than a character size in regions 2a and 4a corresponding to the text. FIG. 22B shows an example in which a character size in regions 1b and 3b corresponding to the index is the same as a character size in regions 2b and 4b corresponding to the text. FIG. 22C shows an example in which a character size in regions 1c and 3c corresponding to the index is smaller than a character size in regions 2c and 4c corresponding to the text. In addition, in the case of a character style in FIG. 22A, the character size in region 3a is larger than the character size in region 1a although both belong to the same index.

In the case of the above styles, a reader can determine the index part easily.

Figure 23:
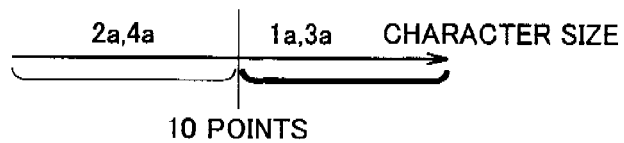
FIG. 23 is a view to describe a conventional method of extracting the index region, and showing an example when the index region is extracted from the document image in FIG. 22A using a specific character size.

According to the conventional example 1, a feature section is provided such that a region having a specific size of 10 points or more is determined to be the index, and a region having a size less than 10 points are determined to be not the index. In this case, as shown in FIG. 23, regions 1a and 3a can be correctly extracted as the index in the document shown in FIG. 22A.

Figure 24:
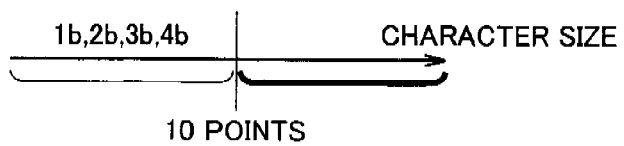
FIG. 24 is a view to describe a conventional method of extracting the index region, and showing an example when the index region is extracted from the document image in FIG. 22B using a specific character size.
Figure 25:
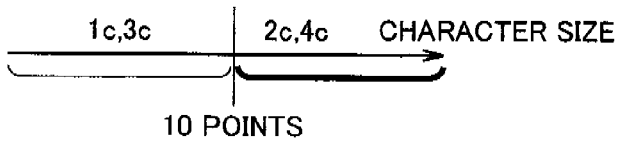
FIG. 25 is a view to describe a conventional method of extracting the index region, and showing an example when the index region is extracted from the document image in FIG. 22C using a specific character size.

However, as shown in FIGS. 24 and 25, with this feature section, the index cannot be correctly extracted in the character styles in FIGS. 22B and 22C because the size of the index part is small.

Figure 26:
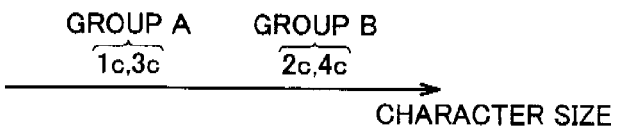
FIG. 26 is a view to describe a conventional method of extracting the index region, and showing an example when the index region is extracted from the document image in FIG. 22C by grouping the character sizes.

According to the conventional example 2, the regions having the similar feature are grouped and then the index is determined. As shown in FIG. 26, in the case of the character style in FIG. 22C, the character sizes are grouped into groups A and B. According to the conventional example 2, the index can be correctly extracted by determining the group whose position is higher or number of lines is smaller as the index.

Figure 27:
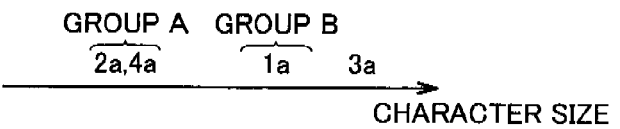
FIG. 27 is a view to describe a conventional method of extracting the index region, and showing an example when the index region is extracted from the document image in FIG. 22A by grouping the character sizes.

However, there may be a case where the character size differs between regions 1a and 3a corresponding to the index like the character style in FIG. 22A. In this case, the indexes cannot be grouped into one as shown in FIG. 27 by the conventional example 2, so that the index cannot be correctly extracted.

According to the above conventional methods, since the used style type (character size, for example) and the feature quantity (10 points, for example) are fixedly set, the index cannot be correctly extracted in some cases. For example, in the conventional example 1, the index could be correctly extracted by discriminating between the types (English/Number/Japanese, for example) of a head character in the first line in addition to the character size, and in the conventional example 2, the index could be correctly extracted by increasing a range of the feature quantity of a group B so as to include regions 1 and 3.

Thus, according to this embodiment, a plurality of style types are used, and a feature section is dynamically set.

In addition, the term "style type" includes an indent amount, justified line, distances from previous and next character string element regions, character string decoration (underline and frame), character kind (head or end), language type, character size, line height, character interval, font, character decoration (thick character and italic character), character color, and background color. In order to extract the index region with accuracy, it is preferable to use at least the indent amount, the feature quantity regarding the size (character size or line height, for example) of the character, and the head character kind in the first line among the above types. In addition, the style type includes various kinds of types which can be discriminated by the reader and available in the document preparation tool.

In addition, the term "feature section" represents a feature value or range with respect to each style type, which is used to discriminate the index region from the other region. In addition, the "feature" may be put into "attribution" of the region itself, the line and character in the region.

<Configuration>
(Entire System Configuration)

According to this embodiment, a description will be made of a MFP (Multi Function Peripheral) representatively as one embodiment of a document image processing apparatus according to the present invention. In addition, the document image processing apparatus according to the present invention is not limited to the MFP and can be applied to a copying apparatus, facsimile apparatus, and scanner apparatus.

Referring to FIG. 1, a MFP1 according to this embodiment includes an image reader 104 for reading a manuscript 300, and a printer 106 for performing a printing process onto a paper medium.

Especially, MFP1 according to this embodiment obtains a document image by reading manuscript 300 with image reader 104, and generates a computerized document 400 containing this document image. Representatively, a format such as PDF (Portable Document Format) can be employed in computerized document 400. In this case, MFP1 extracts at least one index region from the document image, and generates viewing navigation information to specify the position of the extracted index region in the document image.

The "viewing navigation information" means information to support the user to view the document image contained in the computerized document, and more specifically, means information to specify the position of the index region contained in the document image. Such viewing navigation information includes a "bookmark", "comment", "thread", and "link", and it may include a thumbnail (minified image) of the corresponding index region in addition to the information to specify the position of the index region. In this embodiment, a description will be made of a configuration using the bookmark as the representative example of the "viewing navigation information".

MFP1 stores generated computerized document 400 in a memory (not shown) of itself, and also transmits it to personal computers PC1, PC2, and PC3 (referred also to as "personal computer PC" collectively hereinafter), and a mobile terminal MT through the network. As representative usage, MFP1 directly transmits computerized document 400 to personal computers PC1 and PC2 connected to a LAN (Local Area Network) serving as the network provided in the same office as MFP1. On the other hand, a server apparatus SRV is provided at a connection point between the LAN and a WAN (Wide Area Network), and computerized document 400 is transmitted from MFP1 to personal computer PC3 positioned in an office apart from MFP1, through server apparatus SRV. Furthermore, computerized document 400 is transmitted from MFP 1 to mobile terminal MT through the WAN, a public mobile telephone network, and a wireless network line (not shown) such as a wireless LAN. Here, server apparatus SRV representatively includes a mail server, FTP (File Transfer Protocol) server, Web server, and SMB server.

Image reader 104 includes a set tray for setting the manuscript, a manuscript contact glass, a conveyer automatically conveying the manuscript set in the set tray to the manuscript contact glass one by one, and a discharge tray for discharging the read manuscript (all of them are not shown). Thus, the plurality of manuscripts are sequentially read, whereby one computerized document 400 can be generated.

(Schematic Configuration of MFP)

Figure 2:
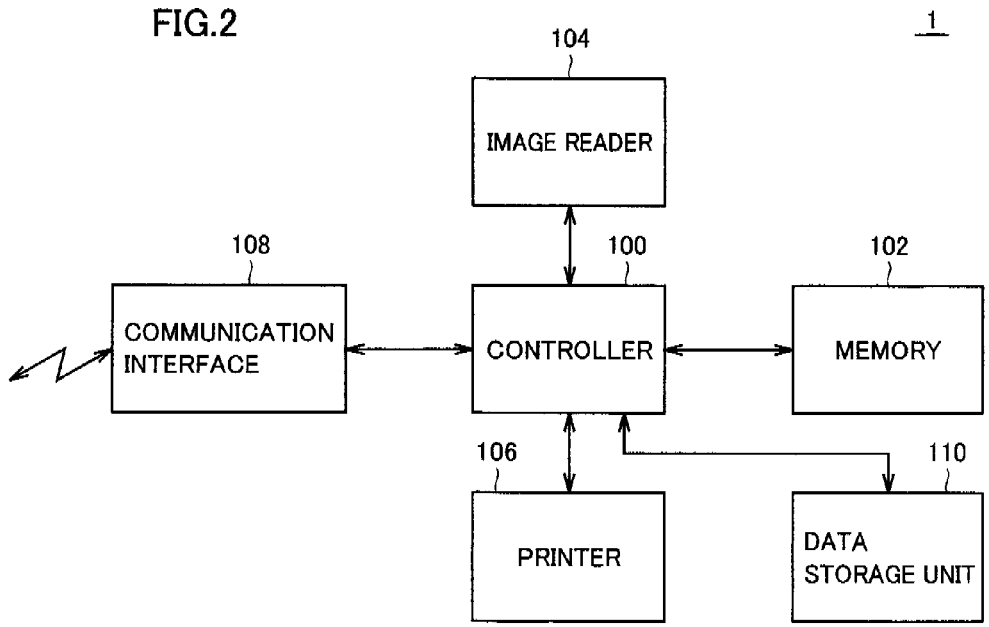
FIG. 2 is a block diagram showing a schematic configuration of the document image processing apparatus according to the embodiment of the present invention.

Referring to FIG. 2, MFP1 includes a controller 100, a memory 102, image reader 104, printer 106, a communication interface 108, and a data storage unit 110.

Controller 100 representatively includes a processing device such as a CPU (Central Processing Unit) and implements the document image processing according to this embodiment, by executing a program. Memory 102 is representatively a volatile memory device such as a DRAM (Dynamic Random Access Memory), and stores the program to be executed by controller 100 and data required to execute the program. Communication interface 108 is representatively a portion for transmitting and receiving data to and from personal computer PC (FIG. 1) and mobile terminal MT through the network (LAN shown in FIG. 1, for example), and includes a LAN adaptor and a driver software for controlling the LAN adaptor. Printer 106 is a portion for performing the printing process, and includes a control device for controlling each of the constituents in addition to a hardware configuration regarding the printing process. Data storage unit 110 is representatively a hard disk device and a nonvolatile memory device such as a flash memory, and stores computerized document 400 generated by controller 100.

(Configuration of Personal Computer)

Figure 3:
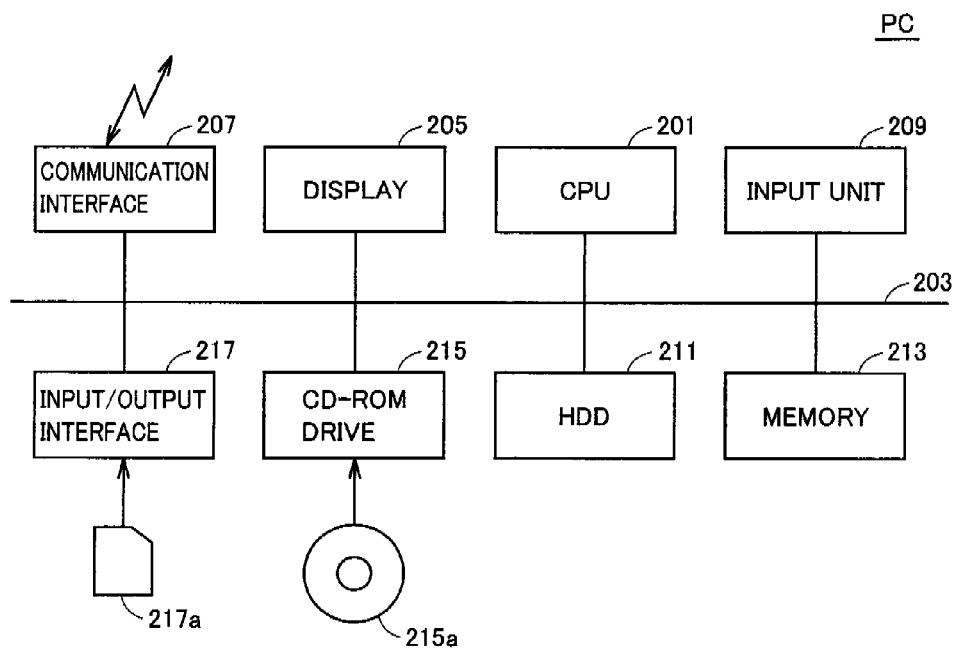
FIG. 3 is a block diagram showing a schematic configuration of a personal computer included in the system shown in FIG. 1.

Referring to FIG. 3, personal computer PC includes a CPU (Central Processing Unit) 201 executing various kinds of programs including an operating system (OS), a memory 213 temporally storing data required to execute the program by CPU 201, and a hard disk drive (HDD) 211 storing the program executed by CPU 201 in a nonvolatile manner. In addition, hard disk drive 211 stores a view application used for displaying the computerized document generated by MFP1, and such program is read from a memory card (SD card, for example) 217a or a CD-ROM (Compact Disk-Read Only Memory) 215 by an input/output interface 217 or a CD-ROM drive 215, respectively.

CPU201 receives an instruction from a user through an input unit 209 such as a key board and a mouse, and also outputs a screen output generated by the program to a display 205. In addition, CPU 201 obtains the computerized document from MFP1 and server SRV (FIG. 1) connected to the LAN and WAN through a communication interface 207 including a LAN card, and stores it in hard disk drive 211. In addition, the above parts exchange data with each other through an internal bus 203.

In addition, since mobile terminal MT is almost equal to the one shown in FIG. 3 except for FDD drive 217 and CD-ROM drive 215, its detailed description will not be repeated.

(Functional Configuration of MFP)

Figure 4:
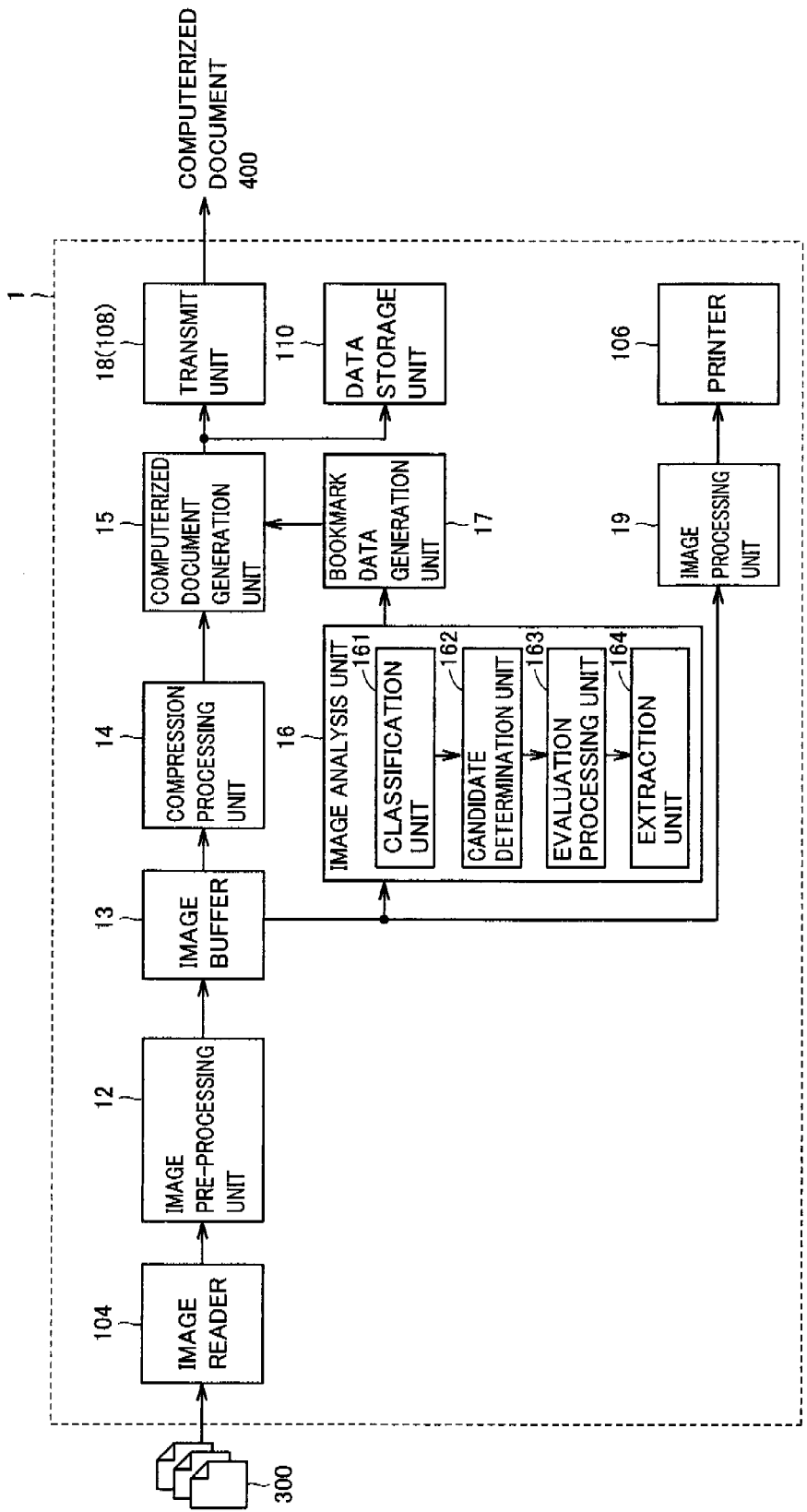
FIG. 4 is a block diagram showing a functional configuration in the document image processing apparatus according to the embodiment of the present invention.

Referring to FIG. 4, a functional configuration of MFP1 includes image reader 104, an image pre-processing unit 12, an image buffer 13, a compression processing unit 14, a computerized document generation unit 15, an image analysis unit 16, a bookmark data generation unit 17, a transmit unit 18, an image processing unit 19, and printer 106. The function of MFP1 is mainly implemented by controller 100 and memory 102 (FIG. 2) of MFP1.

Image reader 104 obtains the document image by reading manuscript 300, and outputs the document image to image pre-processing unit 12. Image pre-processing unit 12 adjusts display characteristics of the document image to make them suitable for the display mainly on personal computer PC. Furthermore, image pre-processing unit 12 may remove a noise contained in the document image. Thus, the document image processed by image pre-processing unit 12 is transmitted to image buffer 13.

Image buffer 13 is a portion temporally storing the data of the obtained document image, and outputs the temporally stored document image to compression processing unit 14, image analysis unit 16, and image processing unit 19.

Compression processing unit 14 compresses the document image outputted from image buffer 13, and outputs it to computerized document generation unit 15. The degree of compression by this compressing process may be changed based on the size of the generated computerized document and required resolution of the document image, and this compressing process may be irreversible conversion such as JPEG (Joint Photographic Experts Group). In addition, when high resolution is required, the compressing process may be omitted.

Image analysis unit 16 analyzes the document image outputted from image buffer 13 and extracts an index region. Image analysis unit 16 includes a classification unit 161, a candidate determination unit 162, an evaluation processing unit 163, and an extraction unit 164 as its function.

Classification unit 161 divides the document image into a plurality of character string element regions (to be described in detail below) and classifies the character string element regions into small regions and large regions. For example, classification unit 161 classifies them based on a size of the region (the number of lines, area, and the number of characters) and whether or not there is a specific character (character which are infrequently used as the index, period, and punctuation). In other words, for each character string element, the character string element is identified as a large region or a small region based on at least one of a size property and a character property of the character string element.

Candidate determination unit 162 determines the small region having a related large region, as a candidate region serving as a candidate of the index region, by comparing an arrangement relationship between the small region and the large region. The "related large region" means a large region subsequent to the candidate region, for example.

Evaluation processing unit 163 evaluates whether or not each candidate region is the index. More specifically, evaluation processing unit 163 sets a feature section which includes the feature of the candidate region but does not include the feature of the related large region regarding the style type which is different in feature from the related large region, among the plurality of style types, with respect to each candidate region.

Then, the large regions and the candidate regions included in the set feature section are grouped, respectively. An index evaluation degree is calculated based on the size of each group, with respect to each candidate region. This index evaluation degree may include an index degree and a non-index degree.

Evaluation processing unit 163 determines whether or not a logical element of each candidate region is the index, based on the calculated index evaluation degree.

Extraction unit 164 extracts the candidate region determined as the index, as the index region. Information (such as positional information) of the extracted index region is transmitted to bookmark data generation unit 17.

Bookmark data generation unit 17 generates bookmark data based on the index region information outputted from image analysis unit 16. In addition, bookmark data generation unit 17 may include a specific logical element (such as a drawing, chart, and caption) other than the index, in the bookmark data. Bookmark data generation unit 17 outputs the bookmark data to computerized document generation unit 15.

Computerized document generation unit 15 generates a computerized document by adding the bookmark data from bookmark data generation unit 17, to the document image compressed by compression processing unit 14. Thus, this generated computerized document is stored in data storage unit 110 or outputted to transmit unit 18, based on the setting by the user. Transmit unit 18 is implemented by communication interface 108, and transmits the computerized document generated by computerized document generation unit 15 to personal computer PC (FIG. 1) through the network such as the LAN.

On the other hand, image processing unit 19 converts the document image outputted from image buffer 13 to an image suitable for the printing operation by printer 106, in response to the user operation. Representatively, the document image defined by RGB display system is converted to image data of CMYK display system which is suitable for color printing. At this time, the color may be adjusted based on the characteristics of printer 106. Printer 106 performs a printing process onto a paper medium based on the image data outputted from image processing unit 19.

It should be noted that the operation of each functional block may be implemented by executing software stored in memory 102, or at least one of functional blocks may be implemented by hardware.

(Data Structure Example of Computerized Document)

Figures 5, 6:
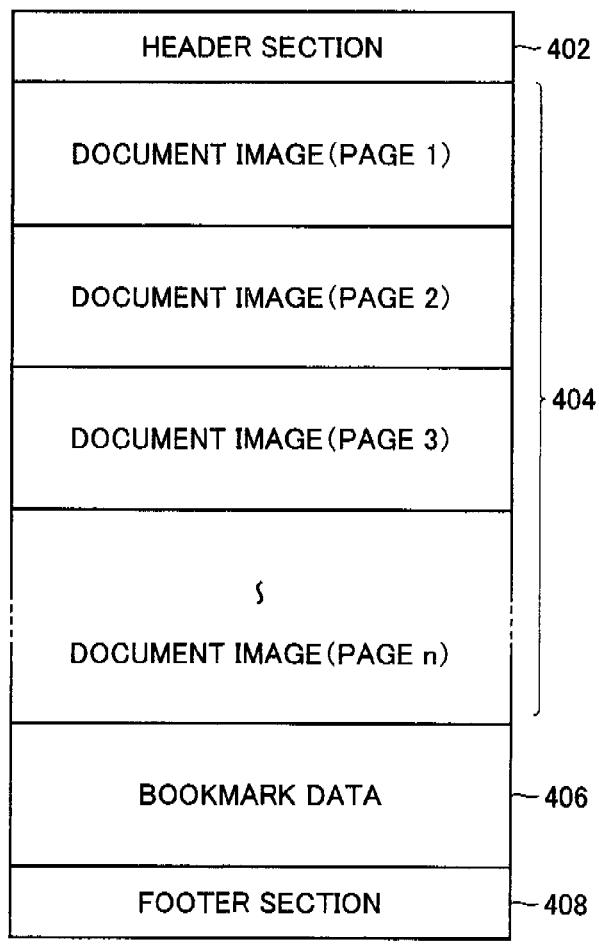
FIG. 5 is a view showing one example of a data structure of a computerized document generated by the document image processing apparatus according to the embodiment of the present invention.
FIG. 6 is a view showing one example of a data structure of a bookmark data included in the computerized document in the embodiment of the present invention.

Referring to FIG. 5, computerized document 400 includes a header section 402, a document image section 404, a bookmark data section 406, and a footer section 408. Header section 402 and footer section 408 stores information regarding the attribution of computerized document 400 such as generated date and time, creator, and copyright information. Document image section 404 stores the document image corresponding to each page. In addition, this document image may be stored in the compressed state as described above. Bookmark data section 406 stores the bookmark data for specifying the index region included in the document image, that is, the character string element region determined as the index.

Referring to FIG. 6, the bookmark data stores a page number, region upper-left coordinates, region lower-right coordinates, and an element type so as to relate them to each index region. The page number is positional information for specifying a page in which the corresponding index region exists. The region upper-left coordinates and the region lower-right coordinates are positional information for specifying a position (rectangle) of the corresponding index region in the page. In addition, the element type is information for specifying the type of the corresponding index region. In addition, the bookmark data may further include positional information of a type of document element (region) other than the index.

<About Operation>

The index region extracting process executed by image analysis unit 16 is the most characteristic process among the processes executed by MFP 1. Therefore, the index region extracting process will be described in detail hereinafter.

With reference to a flowchart shown in FIG. 7, a description will be made of the index region extracting process according to this embodiment. The process shown in the flowchart in FIG. 7 is previously stored in memory 102 as a program, and the function of the index region extracting process is implemented when controller 100 reads and executes this program.

Figure 7:
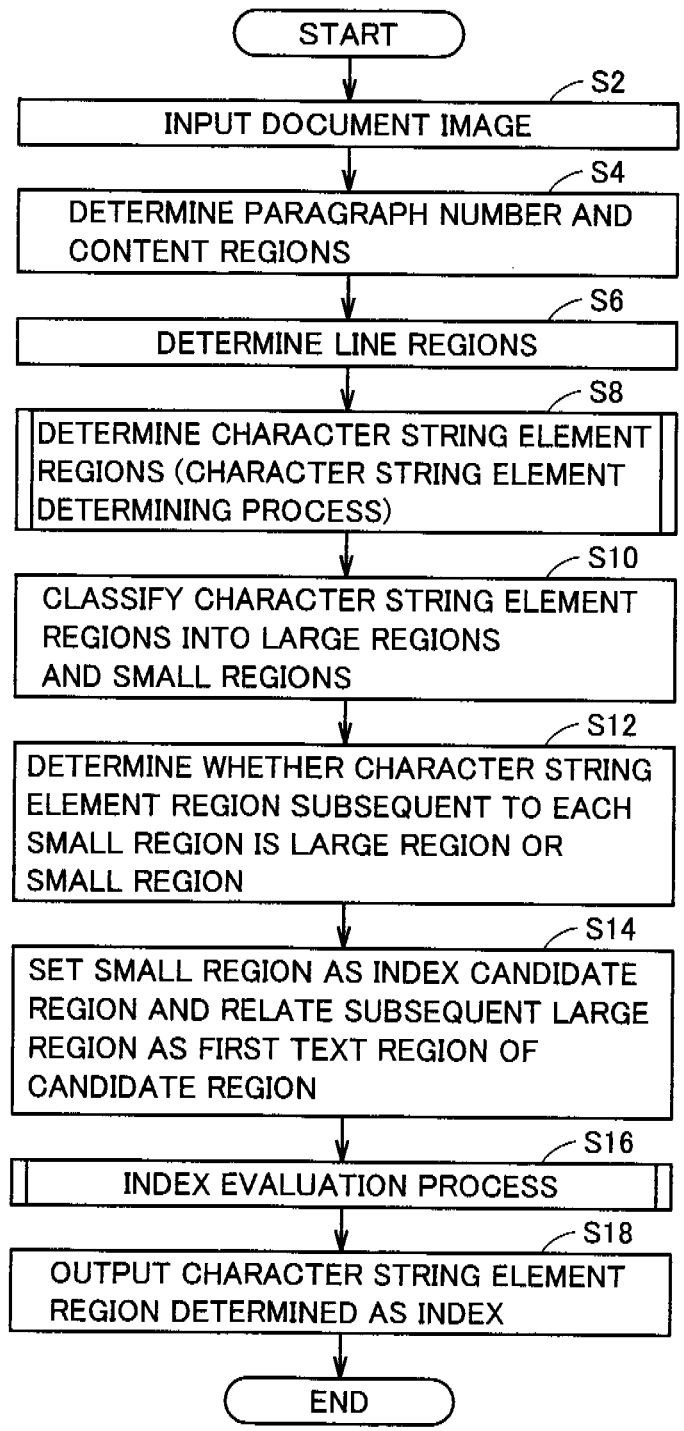
FIG. 7 is a flowchart showing an index region extracting process in the embodiment of the present invention.

Referring to FIG. 7, image analysis unit 16 inputs the data of the document image (step S2). The inputted data of the document image is stored in the internal memory with respect to each page.

Then, the data of each page in the internal memory is read and a content region is determined (step S4). The content region is a partial region of each page and each content region includes characters for one paragraph.

FIG. 8 shows content regions (X1, Y1)-(X2, Y2), (X3, Y1)-(X4, Y2) set in each page of the inputted document image.

The "content region" means a region corresponding to one paragraph on the page, and it is set to the same position with respect to each page. The content region can be acquired by existing various methods.

For example, a projection histogram is generated in a vertical direction for a concentration image of the page, and horizontal positions X1, X2, X3, and X4 of the content region are obtained from the position having the lower total number of the concentration. Similarly, a projection histogram is generated in a lateral direction, and vertical start and end positions Y1 and Y2 of the content region are obtained.

Then, image analysis unit 16 determines line regions (step S6). The line region can be acquired by existing various methods. For example, a projection histogram is generated in a vertical direction for the concentration image of the content region, and positions of upper and lower ends in each line region can be obtained from the position having the lower total number of the concentration.

Then, image analysis unit 16 determines the character string element regions (character string element determining process) (step S8). The character string element region is acquired by integrating the line regions. Image analysis unit 16 controls the integration using the size of a right margin in each line region and an end-of-line character kind.

With reference to a flowchart in FIG. 9, a description will be made of the character string element determining process according to the embodiment of the present invention.

Figure 9:
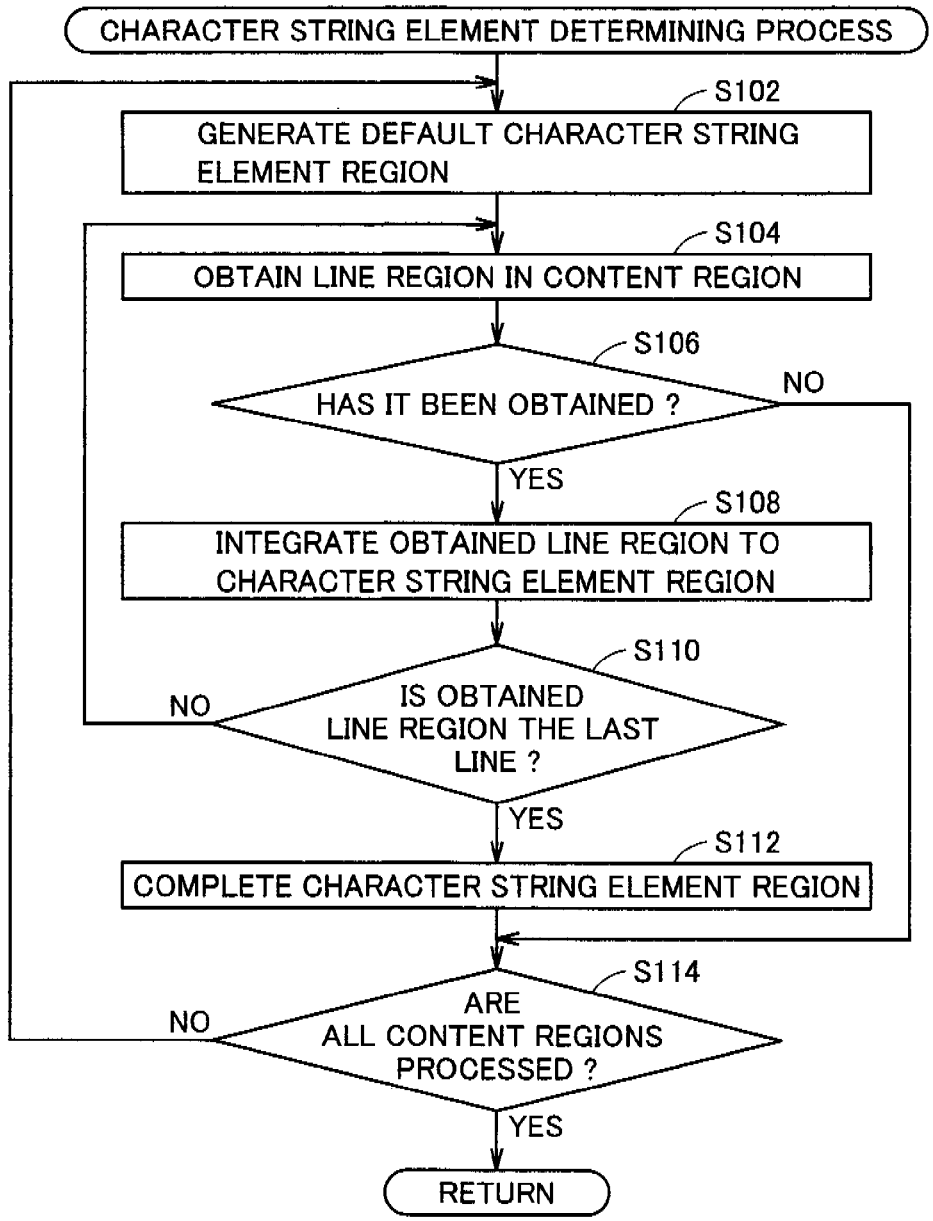
FIG. 9 is a flowchart showing a character string element determining process in the embodiment of the present invention.

Referring to FIG. 9, one default character string element region is generated first (step S102). Then, one unprocessed line region is obtained according to the reading order (step S104). More specifically, the line to be obtained is positioned uppermost content region having a small page number and positioned on the left.

Then, it is determined whether or not the line region has been obtained in step S104 (step S106). When there is no unprocessed line region, it is determined that the region has not been obtained (NO in step S106), the process proceeds to step S114.

Meanwhile, when the line region has been obtained (YES in step S106), the obtained line region is integrated into the character string element region (step S108).

Then, image analysis unit 16 determines whether or not the obtained line region is the last line (step S110). Mores specifically, it is determined whether the right margin of the obtained line region is more than a predetermined value or whether the end-of-line character kind is a period. The predetermined value of the right margin is set to a height of the character in the line region, for example. When it is determined that the obtained line region is the last line (YES in step S110), the process proceeds to step S112. When it is not (NO in step S110), the process returns to step S104, and the above steps are repeated.

In step S112, image analysis unit 16 completes the character string element region. After this process, the process proceeds to step S114.

In step S114, it is determined whether or not all of the content regions are processed. When there is an unprocessed content region (NO in step S114), the process returns to step S102. When there is no unprocessed content region (YES in step S114), the character string element determining process is completed.

Figure 10:
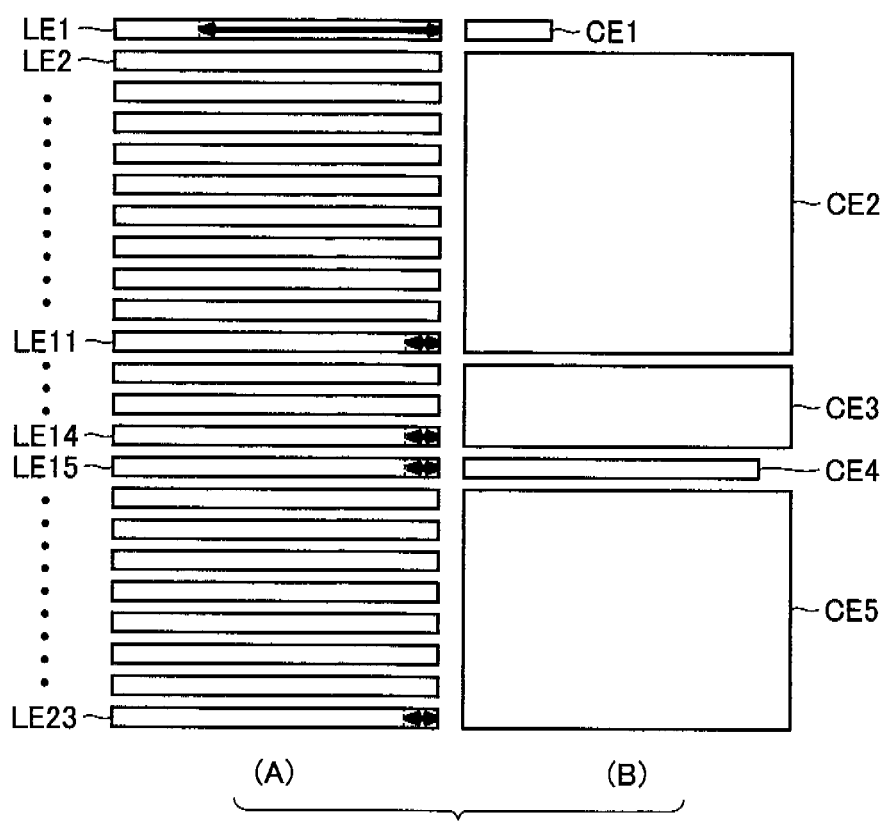
FIG. 10 is a view to describe a character string element region.

With reference to FIG. 10, an example of the character string element region will be described.

It is assumed that FIG. 10(A) shows a part of the line regions determined in step S6 in FIG. 7. FIG. 10(B) shows the determined result of the character string element regions performed for the line regions shown in FIG. 10(A).

Line regions (shown by "LE" in the drawing) 1, 11, 14, 15, and 23 are determined to have the right margin in step S110. Therefore, line regions 1 and 15 independently constitute character string element regions (shown by "CE" in the drawing) 1 and 4, respectively. In addition, line regions 2 to 11, 12 to 14, and 16 to 23 are integrated in a vertical direction and character string element regions 2, 3, and 5 are generated, respectively.

When the character string element region have the right margin, a region excluding the right margin is set as the character string element region.

Referring to FIG. 7 again, when the character string element determining process is completed, classification unit 161 of image analysis unit 16 classifies the character string element regions into large regions and small regions (step S10). More specifically, an area of each character string element region, an average character height in the entire document, and an average width of the content region in the entire document are calculated, for example. When the area of the character string element region is larger than the value obtained by "the average character height in the entire document"×"the average width of the content region of the entire document"×2, that character string element region is determined as the large region, and otherwise determined as the small region. In other words, for each character string element, the character string element is identified as a large region or a small region based on at least one of a size property and a character property of the character string element.

Figure 11:
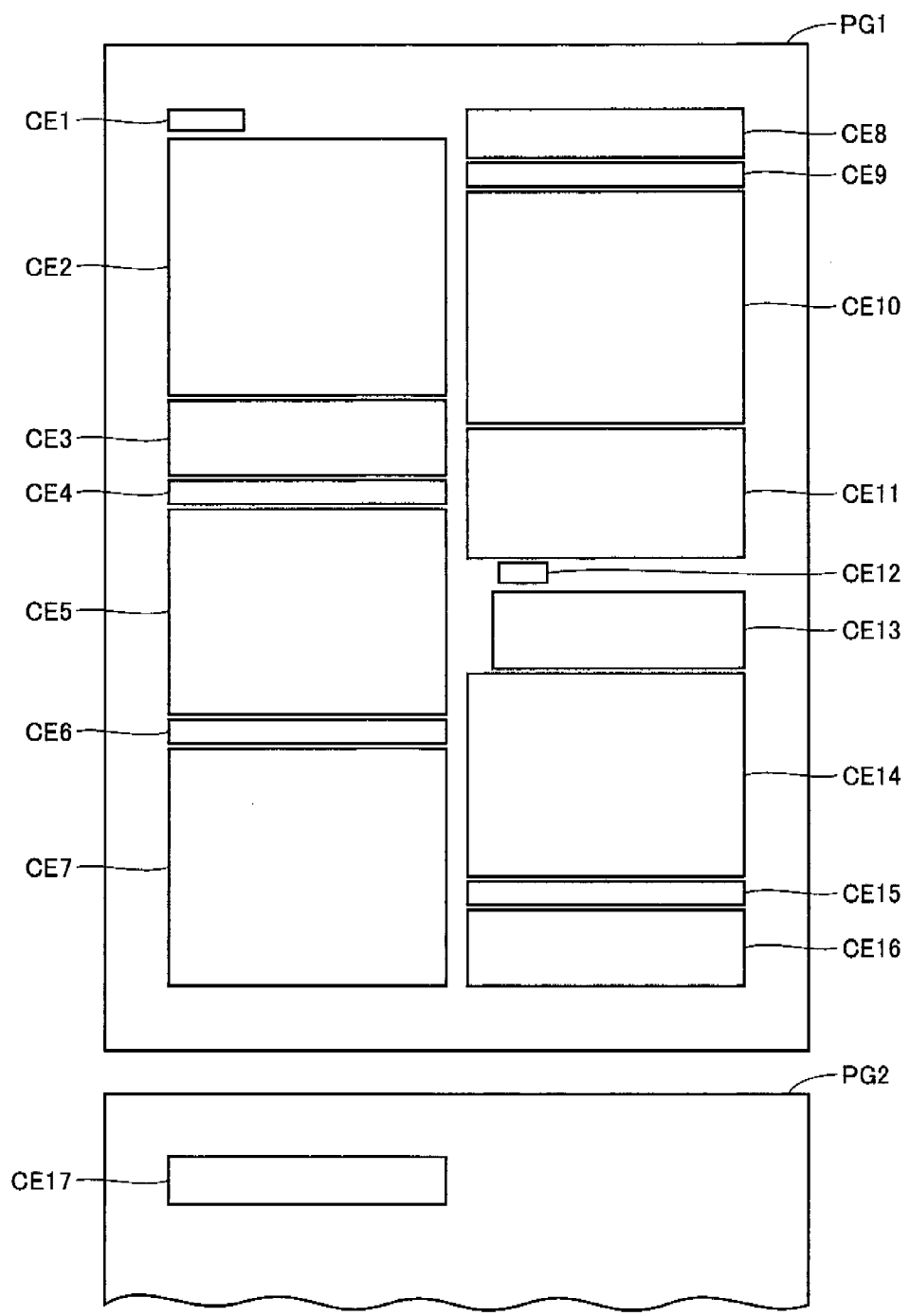
FIG. 11 is a view showing an example of the character string element region generated by the page.
Figure 12:
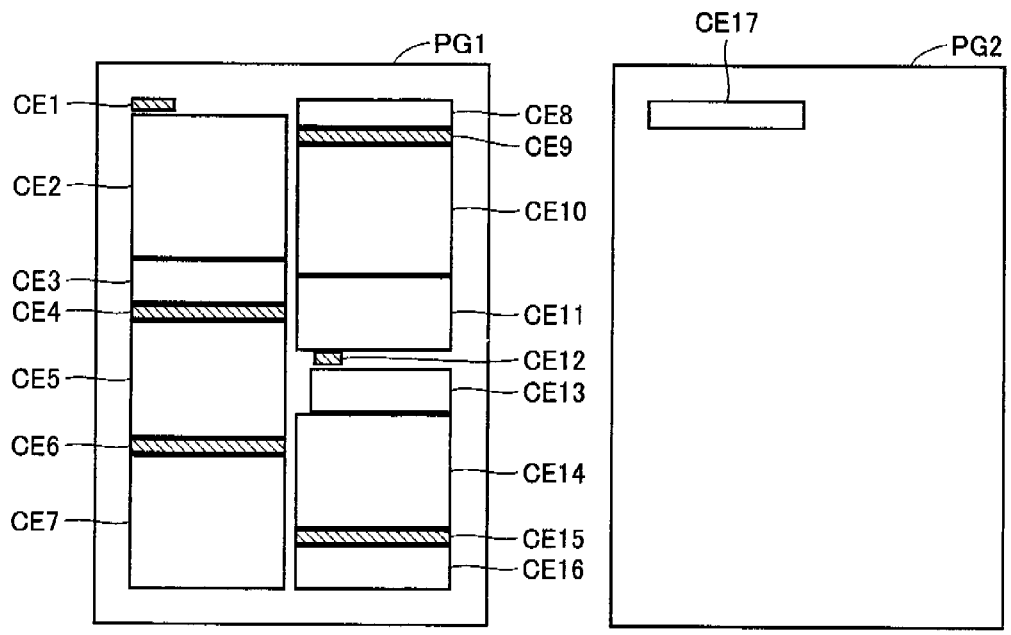
FIG. 12 is a view showing a classified result to a large region and a small region in the character string element region shown in FIG. 11.

With reference to FIGS. 11 and 12, such classifying process will be described. FIG. 11 shows an example of the character string element regions generated in each page.

Referring to FIG. 11, character string element regions 1 to 16 (CE1 to CE16) are generated on a page PG1, and a character string element region 17 (CE17) is generated on a page PG2.

FIG. 12 shows a classified result between the large region and the small region for the character string element regions shown in FIG. 11.

Referring to FIG. 12, hatched character string element regions 1, 4, 6, 9, 12, and 15 are classified as the small region. Other character string element regions 2, 3, 5, 7, 8, 10, 11, 13, 14, 16, and 17 are classified as the large region.

After classifying the character string element regions, candidate determination unit 162 of image analysis unit 16 determines whether the character string element region following the small region is the large region or the small region (step S12). That is, it is determined whether or not the small region, on its lower side, has the subsequent large region.

Candidate determination unit 162 determines that the small region having the following large region is the index candidate region (referred to as the "candidate region" hereinafter) (step S14). In addition, the large region subsequent to the candidate region is related to the preceding candidate region. In other words, the large region subsequent to the candidate region is a related text region. In the following description, the large region related to the candidate region is referred to as the "first text region". In addition, character string element regions 1, 4, 6, 9, 12, and 15 determined as the candidate regions are also expressed by candidate regions 1, 4, 6, 9, 12, and 15, respectively.

Figure 13:
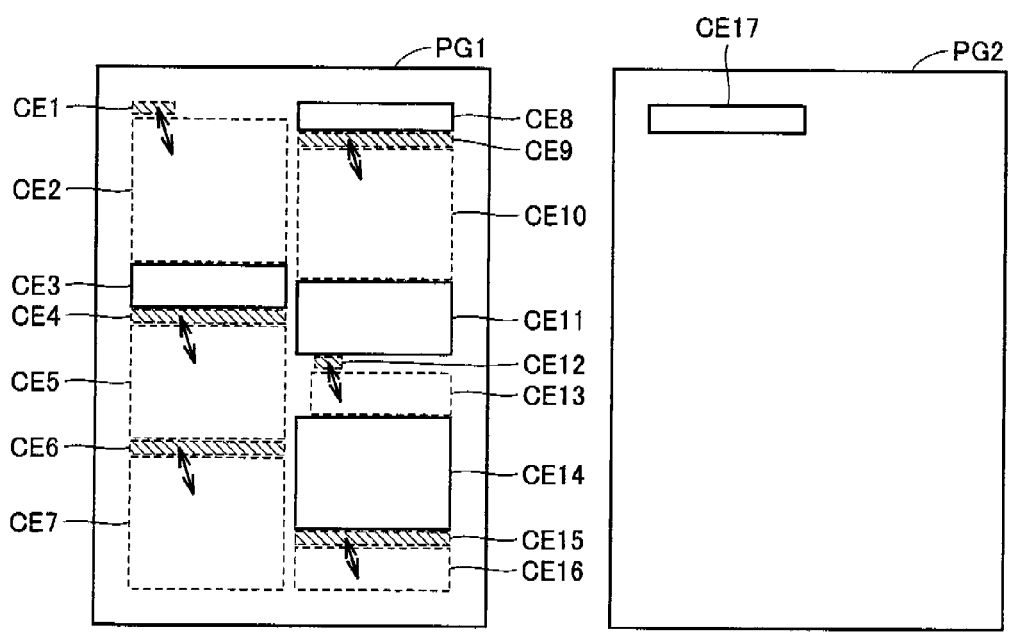
FIG. 13 is a view showing a relationship between a candidate region serving as an index region candidate, and a large region related to the candidate region.

FIG. 13 shows the relationship between the candidate region and the large region (first text region) related to the candidate region.

Referring to FIG. 13, all of the character string element regions shown as the small regions in FIG. 12 are determined as the candidate regions. The character string element region determined as the first text region with respect to each candidate region is surrounded by dotted line.

More specifically, the first text region of candidate region 1 is character string element region 2, and the first text region of candidate region 4 is character string element region 5. The first text region of candidate region 6 is character string element region 7, and the first text region of candidate region 9 is character string element region 10. The first text region of candidate region 12 is character string element region 13, and the first text region of candidate region 15 is character string element region 16.

Character string element regions 2, 5, 7, 10, 13, and 16 determined as the first text regions are also expressed by first text regions 2, 5, 7, 10, 13, and 16, respectively.

After the process in step S14, the index evaluating process is executed (step S16).

Referring to a flowchart in FIG. 14, a description will be made of the index evaluating process according to this embodiment of the present invention.

Figure 14:
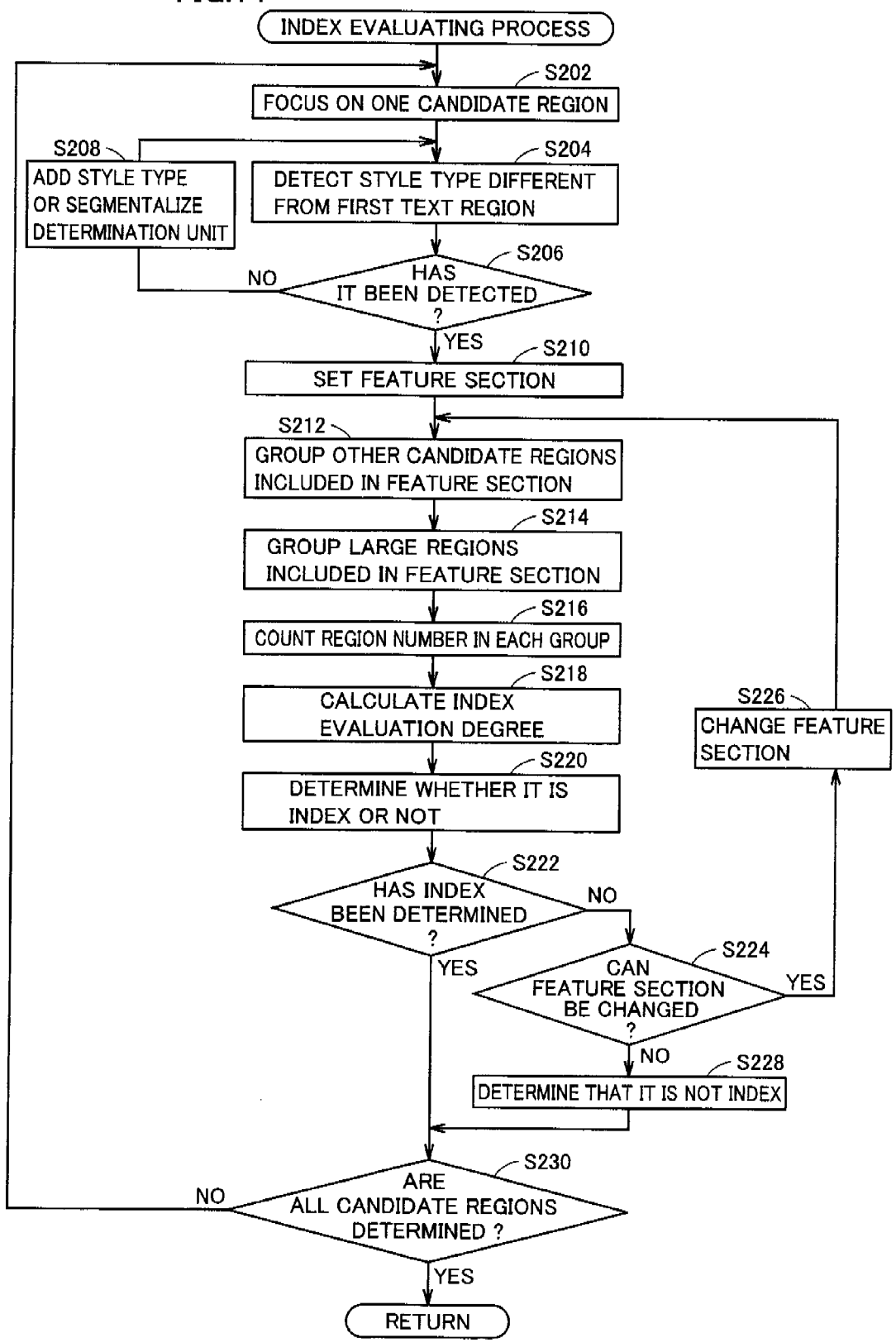
FIG. 14 is a flowchart showing an index evaluating process in the embodiment of the present invention.

Referring to FIG. 14, evaluation processing unit 163 of image analysis unit 16 focuses on one candidate region first (step S202). In other words, one candidate region is selected as a focused index candidate region. That is, one candidate region among the plurality of candidate regions is selected according to the reading order, for example. Then, it is determined whether or not the focused candidate region is the index or not (step S204 to S224).

More specifically, the style type different in feature from the first text region is detected from the plurality of default style types (step S204). In other words, the formatting of the index candidate region is compared to the formatting of the related text region to identify a formatting property that is different between the index candidate region and the related text region. The formatting property that is different can be referred to as a different formatting property.

According to this embodiment, the default style types are the head character kind (three kinds) in the first line, the character height, and the indent amount.

The feature or value of each style type may be calculated by an existing method. As for the "head character kind in the first line", three kinds of number/Japanese/English are determined, for example. The character kind may employ a mother language and a foreign language as kinds of language other than the discrimination between the number and the language. As for the "character height", the height of most frequent character in the character string element region is determined in units of ½ character height. As for the "indent amount", a distance from a left side of the content region to the left side of the character string element region is determined in units of ½ character height. It will be understood that the "value" can be either a numeric value, as in the case for character height or indent amount, or a non-numeric value, as in the case for head character kind in the first line.

When the style type different in feature from the feature of the first text region is detected (YES in step S206), the process proceeds to step S210.

Even when the candidate region is determined that there is no difference in style type, some kind of difference can be found in many cases by comparing the features by various methods in an exploratory manner and adding a style type or segmentalizing the determination unit of the style type (adding the feature quantity). Therefore, according to this embodiment, when there is no difference in style type (NO in step S206), and the index evaluation degree (as will be described below) cannot be calculated, a new style type is added or the determination unit of the style type is segmentalized (step S208). Then, the process returns to step S204.

In step S208, the determination kinds of the head character in the first line is changed from the three kinds such as number/Japanese/English to five kinds such as number/hiragana (one kind of Japanese kana character)/katakana (one kind of Japanese kana character)/Chinese character/English. Thus, the plural kinds of characters in the same language (hiragana, katakana, Chinese character, for example) may be employed as the character kind. Alternatively, a "character color" may be added as another style type.

In step S210, evaluation processing unit 163 sets the feature section only including the feature of the candidate region, as for the style type determined to be different in feature. The feature section is preferably set to be close to the feature of the candidate region but not to include the feature of the first text region by comparing the candidate region and the first text region. More specifically, the feature is divided into a certain range around the feature value of the candidate region (the feature of the first text region is not included) and the others (the feature of the first text region is included), and the former is set as the feature section. In other words, an evaluation criterion is set such that a value of the index candidate region for the different formatting property satisfies the evaluation criterion, while a value of the related text region for the different formatting property does not satisfy the evaluation criterion.

Alternatively, the feature section may be set by determining whether the feature is close to the feature of the candidate region or to the feature of the first text region. More specifically, a middle point is set between the feature value of the candidate region and the feature value of the first text region, and the section including the feature value of the candidate region may be set as the feature section.

With reference to FIG. 15, a description will be made of an example of the feature section set with respect to each candidate region when the default style type is used.

Referring to FIG. 15, candidate region 1 and corresponding first text region 2 are only different in the head character kind (three kinds) in the first line, for example. The style type different between both regions is shown in a "different feature list" in FIG. 15. When it is assumed that the head character of candidate region 1 is the number and the head character of first text region 2 is Japanese (hiragana), the feature section is set to the "number".

The same is applied to candidate regions 6, 9, and 15. It is noted that it is assumed that the head characters of first text regions 7 and 16 corresponding to candidate regions 6 and 15 are Japanese (katakana).

In addition, candidate region 12 is only different from corresponding first text region 13 in indent amount. With reference to FIG. 16, a setting example of the feature section in this case will be described.

Referring to FIG. 16, the indent amounts of candidate region 12 and first text region 13 from a reference line L1 of the content region are 7.5 and 6.5, respectively. In this case, the feature section as for the indent amount is set to indent amount of 7 to 8, for example.

The head character kind of candidate region 4 is katakana, and the head character kind of corresponding first text region 5 is hiragana. In addition, there is no difference in character height and indent amount between both regions. In this case, there is no difference in style type in the default style type.

Thus, when it is assumed that the head character kinds in the first line are changed to the five kinds, candidate region 4 and first text region 5 are different in head character kind in the first line.

With reference to FIG. 17, a description will be made of an example of the feature section when the "head character kinds (five kinds) in the first line" are added to the default style types.

Referring to FIG. 17, all of the candidate regions are different from the corresponding first text regions in head character kinds (five kinds) in the first line. Therefore, the "head character kinds (five kinds) in the first line" are added into a different feature list in each candidate region. The feature section of candidate region 4 is set to katakana.

It is noted that while the head character kinds (three kinds) in the first line, the character height, the indent amount, and the head character kinds (five kinds) in the first line are used as the style types in the above example, another type such as character size and character color may be used.

A description will be made of a setting example of the feature section when the character size is different, for example.

Referring to FIG. 18, it is assumed that the character size of the certain candidate region is 14 points and the character size of the corresponding first text region is 10 points. In this case, since the center value between the candidate region and the first text region is 12 points, the feature section is set to 12 to 16 points, for example. The upper limit value (16 points) of the feature section can be set such that the character size of the candidate region+(character size of the candidate region−the center value), for example.

Referring to FIG. 14 again, evaluation processing unit 163 groups the other candidates included in the set feature section with respect to each focused candidate region (step S212). In other words, index candidate regions, other than the focused index candidate region, that satisfy the evaluation criterion are grouped together. Similarly, the large regions included in the feature section are grouped (step S214). In other words, the large regions that satisfy the evaluation criterion for the focused different formatting property are grouped. In steps S212 and S214, the character string element region having the similar feature is specified with respect to each candidate region.

FIG. 19 shows the grouped result when each feature section shown in FIG. 17 is used.

In FIG. 17, the feature section is set to the "number" in candidate region 1. Therefore, candidate regions 6, 9, 15 exist in the group of the other candidate regions included in the feature section (the head character kind in the first line is the "number"). The group of the large region included in that feature section does not exist.

The similar result to candidate region 1 is shown as for candidate regions 6, 9, and 15.

As for candidate region 4, the feature section is set to "katakana". Therefore, the group of the other candidate region included in the feature section does not exist. Character string element regions 7 and 16 exist in the group of the large region included in that feature section. In addition, character string element regions 8 and 17 exist in the group of the small region other than the candidate region. It is noted that the small regions other than the candidate region may not be grouped.

In addition, the "indent of 7 to 8", and the "Chinese character" are set in candidate region 12. Therefore, there is no group of the other candidate region and no group of the large region included in that feature section.

Referring to FIG. 14 again, after the grouping process, evaluation processing unit 163 counts the number of regions in each group (step S216). More specifically, evaluation processing unit 163 counts the number of character string element regions in the group of the candidate regions, and the number of the character string element regions in the group of the large regions. In other words, a total number of index candidate regions and large regions that satisfy the evaluation criterion are counted. Thus, based on the counted result of each group, the index evaluation degree of the focused candidate region is calculated (step S218).

The index evaluation degree is calculated based on at least one of the number of similar index candidate regions and the number of similar large regions. In order to calculate the index evaluation degree with high accuracy, it is preferable to consider the positional relationship between the character string element regions in each group and the focused candidate region. Therefore, in step S216, the number of the character string element regions included in the feature section of the focused candidate region may be counted with respect to each of the number of candidate regions in the same page, the number of candidate regions in the different page, the number of subsequent large regions (first text region), and number of non-subsequent large regions (other than the first text region). According to this embodiment, the index evaluation degree is calculated in view of the positional relationship with the focused candidate region in this way.

Here, with reference FIG. 20, a description will be made of a specific example of the method of calculating the index evaluation degree.

Referring to FIG. 20, the index evaluation degree includes a non-index degree and an index degree.

Based on the number and positions of the large regions included in the set feature section (such large regions are referred to as the "similar large regions" hereinafter), the non-index degree of the focused candidate region is calculated. When one large region is included, one point is added to the non-index degree.

Here, considering the number of the character string element regions between the focused candidate region and the similar large regions (that is, distance from the focused candidate region), when the similar large regions are sequential across the candidate region, five points are added to the non-index degree, for example. This is because the style difference becomes clear between the index and the text as they get close to each other (the distance decreases), and the logical role is expressed as the difference in stile in many cases. In other words, the difference in style from the discontinuous distant regions or the region on different pages is not intended by a writer in some cases. Therefore, it is desirable to put weight on the number of the continuous regions or the regions on the same page.

In addition, based on the number and position of the candidate regions included in the set feature section (such candidate region is referred to as the "similar other candidate region" hereinafter), the index degree of the focused candidate region is calculated. When one similar other candidate region exists, one point is added to the index degree. Here also, in view of the page of the similar other candidate region, when the similar other candidate region exists on the same page as the focused candidate region, two points are added to the index degree, for example.

As a result, as shown in FIG. 20, as for candidate regions 1, 6, 9, and 15, the non-index degree is "0" and the index degree is "6". As for candidate region 4, the non-index degree is "2" and the index degree is "0". As for candidate region 12, the non-index degree and the index degree are both "0".

Evaluation processing unit 163 determines whether or not the focused candidate region is the index, based on the calculated result of the index evaluation degree (step S220). More specifically, when the non-index degree is "2" or less and the index degree is "2" or more, the candidate region is determined as the index. As a result, candidate regions 1, 6, 9, and 15 are determined as the index. Since the non-index degree is "2" as for candidate region 4, it may be determined that candidate region 4 is not the index.

Here, a method of determining whether the index or not will be described further in detail.

Based on the number of character string element regions in each group, when the number of index candidate regions included in the same group as the target region is great, it is determined that the target region is highly likely to be the index. Meanwhile, when the number of the large regions included in the same group is great, it is determined that the target region is highly likely to be not the index. When both are included, determination is made such that it is highly likely to be the same as the one having a relatively great number. For example, the determination can be made under the following condition.

When C2−C1≥2 wherein C1 represents the non-index degree and C2 represents the index degree, it is determined that the character string element region is the index. When C2−C1≤−2, it is determined that the character string element region is not the index. When C2−C1<2 and C2−C1>−2, it is determined that the index determination cannot be made.

In this case, character string element regions 1, 6, 9, and 15 are determined to be the index because C2−C1=6. Character string element region 4 is determined to be not the index because C2−C1=−2. Character string element region 12 is determined that the index determination cannot be made because C2−C1=0.

While the index evaluation degree is calculated based on both of the index degree and the non-index degree in this embodiment, only either one may be used. In this case, only the large regions may be grouped or only the small region may be grouped.

Next, evaluation processing unit 163 determines whether or not the index determination has been made on the focused candidate region (step S222). When the index determination has been made (YES in step S222), the process proceeds to step S230. When the index determination has not been made (NO in step S222), the process proceeds to step S224.

In step S224, it is determined that whether or not the feature section set for the focused candidate region can be changed. When it can be changed, the feature section is changed (in step S226), and the process returns to step S212. When it cannot be changed, it is determined that the focused candidate region is not the index (step S228), and the process proceeds to step S230.

As shown in FIG. 20, the non-index degree and the index degree are both "0" as for candidate region 12. Therefore, it is determined that the index determination cannot be made.

However, there are several kinds of style types discriminated between the candidate region and the related text region in some cases. In addition, there are several methods of setting the feature section. Therefore, there is a case where the grouped result is changed and the index determination can be made by changing the method of setting the feature section.

Thus, as for candidate region 12 in which the index determination could not be made, the feature section is changed and the grouping is performed again. The different style types of candidate region 12 are set to the "indent amount" and the "head character kind in the first line". In changing the feature section, it is preferably to select the style type in which the feature section can be easily changed. Therefore, in this case, the feature section of the indent amount is to be changed and the head character kind in the first line is not to be changed.

It is assumed that whether or not the feature section can be changed is predetermined with respect to each style type. Other than the indent amount, the style type whose feature value is sequential such as the character height and the character size can be set to be changeable.

For example, in the example shown in FIG. 16, the feature section is set to the indent of 7 to 8 at first. In this case, the range of the indent may be expanded to the indent of 6.6 to 8.4 so as not to include the indent amount (6, 5) of the first text region.

Alternatively, the feature section is initially set to the character size of 12 to 16 points in the example shown in FIG. 18, for example. In this case the range of the character size may be changed to be 11 to 17 points so as not to include the character size (10 points) of the first text region.

When the feature section is changed, only a threshold value on the side of the first text region may be used. For example, in the example in FIG. 16, the range of the indent may be set to 6.6 or more.

Moreover, even when it is determined that the feature section cannot be changed in step S224, as shown in steps S208 to S210, the new style type may be added to set a new feature section. Thus, the feature section may be changed (added).

As described above, according to this embodiment, the feature section can be changed and the index evaluation degree can be calculated again. Therefore, the region serving as the index can be extracted with high accuracy in any type of document.

When the determination cannot be made even after the feature section has been changed several times (two times, for example), it is preferable to stop changing the feature section in step S224. Thus, the processing time is prevented from becoming problematically long. In this case, the candidate region in which the index determination cannot be made is determined to be not the index.

In step S230, it is determined whether or not all of the candidate regions have been determined. When there is an undetermined candidate region (NO in step S230), the process returns to step S202, and the above steps are repeated. When it is determined that all of the candidate regions have been determined (YES in step S230), the index evaluating process is completed.

FIG. 21 shows the index determined result of candidate regions (character string element regions) 1, 4, 6, 9, 12, and 15 shown in FIG. 13. As shown in FIG. 21, the candidate regions determined as the index, that is, the index regions are character string element regions 1, 6, 9, and 15.

Referring to FIG. 7 again, when the index evaluating process is completed, extraction unit 164 of image analysis unit 16 extracts the character string element region determined as the index (that is, the index region) from the candidate regions, and outputs it to bookmark data generation unit 17 (step S18). Thus, bookmark data generation unit 17 generates the bookmark data as shown in FIG. 6 to make the inputted index region function as the bookmark.

Thus, the index region extracting process according to this embodiment of the present invention is completed.

As described above, according to this embodiment, with the plurality of style types, the feature section can be dynamically set based on the feature (attribution), which can be discriminated from the text, with respect to each candidate region. Thus, the index evaluation degree can be calculated with the set feature section with respect to each candidate region. Thus, even when the index is not uniform in head character kind in the first line, the index is not uniform in indent, and the index is not uniform in character size, the index region can be appropriately extracted.

Especially, when the plurality of features are mixed in the indexes, or when the two or more indexes whose character size is large and two or more indexes whose head character kind in the first line exist is the number are mixed in a document, the index can be extracted similarly.

In addition, according to this embodiment, since the feature section can be automatically set with the plurality of style types, the index region can be extracted even when the user does not designate (and switch) the style type to discriminate the difference between the index and the text.

Furthermore, even when the feature section cannot be set as for the default style type, the feature section can be surely set with respect to each candidate region by adding the style type. As a result, the present invention can be flexibly applied to various styles of documents.

In addition, a part of the text can be prevented from being erroneously determined as the index by adding many points to the non-index degree when the region is similar to the large region adjacent to the index candidate (candidate region) in calculating the index evaluation degree, so that erroneous determination can be prevented. It is noted that by setting the plurality of evaluation values based on the relative position from the index candidate, when the region is similar to the closer large region, the non-index degree may be highly evaluated.

Furthermore, while five points are added when the region is similar to the continuous large regions positioned across the index candidate in the above embodiment, many points (ten points, for example) may be added when the region is similar to the subsequent large region.

In addition, according to this embodiment, many points are added to the index degree when similar index candidate exists on the same page as the index candidate. Thus, the indexes having a unified feature so as to be identified at a glance can be surely detected, while one part of the text having the same feature as the index on another page can be prevented from being erroneously determined. The index degree may be highly evaluated by setting the plurality of evaluation values based on the relative position from the index candidate when the region is similar to the closer index candidate.

In addition, while the candidate region is determined as the index when the non-index degree is "2" or less and the index degree is "2" or more in the above embodiment, another method may be used as long as the similarity to another index candidate and the difference from the large region can be determined to be in an appropriate state.

Furthermore, while the last line is determined when the right margin has a predetermined value or more, or the end-of-line character kind is the period in step S110 to determine the character string element region (FIG. 9) in the above embodiment, the last line may be determined when the character height in the line is changed more largely than a predetermined value. Alternatively, the similar configuration may be provided using another feature which can be used for telling the difference between the index and text instead of using the character height. Thus, the character string element region can be preferably generated in various kinds of document types.

While the area of the document region is used in classifying the large regions and the small regions, a feature quantity such as the height, the width, the line number and/or character number of the character string element region may be used in the classification.

In addition/alternatively, when the small region is the last character string element region in the content region, the head character string element region of the subsequent content region on the right side or of the content region on the left side on the next page may be treated as the continuous character string element region. Thus, it may be determined whether the continuous character string element region is the large region or not. Thus, even when the index exists at the lowest part of the content region, the present invention can be applied thereto.

The subsequent character string element region can be specified by using other various methods to estimate the reading order.

While MFP1 has been described in the above embodiment, the index region extracting process may be executed in personal computer PC as shown in FIG. 3, and the mobile terminal such as a mobile telephone. The index region extracting process in this embodiment can be executed in various kinds of computers having at least a processing device such as a CPU and a memory to store a document image and the like.

In addition, the index region extracting processing method (document image processing method) executed by the document image processing apparatus according to the present invention may be provided as a program. Such program can be provided as a program product when stored in an optical medium such as a CR-ROM (Compact Disc-ROM), and a computer-readable non-transitory recording medium such as a memory card. In addition, the program can be downloaded through the network.

Furthermore, the program according to the present invention may be executed by calling up a necessary module in a certain arrangement at certain timing, among program modules provided as one part of an operating system (OS) of the computer. In this case, the module is not provided in the program itself and the process is executed together with the OS. The program in which the module is not provided can be included in the program according to the present invention.

In addition, the program according to the present invention may be combined in a part of another program and provided. In this case also, a module provided in the other program is not provided in the program itself, and the process is executed together with the other program. The program combined in the other program can be included in the program according to the present invention.

The provided program product is installed in a program storage such as a hard disk and executed. In addition, the program product includes a program itself, and a recording medium storing the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A document image processing apparatus for use with a document image comprising a plurality of character string element regions, the document image processing apparatus comprising:
    a memory for storing the document image; and
    a controller for controlling extraction of an index region from said document image,
    wherein said controller is configured to:
        for each character string element region, identify the character string element region as a large region or a small region based on at least one of a size property and a character property of the character string element region;
        for each small region, identify the small region as an index candidate when a region immediately following the small region is a large region, and identify the large region immediately following the index candidate region as a related text region;
        for each index candidate region, compare formatting of the index candidate region to formatting of the related text region and identify a formatting property that is different between the index candidate region and the related text region as a different formatting property;
        for each index candidate region, set an evaluation criterion such that a value of the index candidate region for the different formatting property satisfies the evaluation criterion and a value of the related text region for the different formatting property does not satisfy the evaluation criterion;
        for each index candidate region:
            set the index candidate region as the focused index candidate region and set the different formatting property of the focused index candidate region as the focused different formatting property;
            calculate at least one of a number of similar index candidate regions and a number of similar large regions, wherein:
                the number of similar index candidate regions is a total number of index candidate regions among the index candidate regions, except for the focused index candidate region, that satisfy the evaluation criterion for the focused different formatting property; and
                the number of similar large regions is a total number of large regions that satisfy the evaluation criterion for the focused different formatting property;
            calculate an index evaluation degree based on at least one of the number of similar index candidate regions and the number of similar large regions;
        identify index regions from among the index candidate regions based on the index evaluation degree of each index candidate region.

2. The document image processing apparatus according to claim 1, wherein the index evaluation degree is such that as the number of similar index candidate regions increases, a likelihood of identifying the index candidate region as an index region increases; and
    as the number of similar large regions increases, the likelihood of identifying the index candidate region as an index region decreases.

3. The document image processing apparatus according to claim 2, wherein said controller identifies the index candidate region as an index region when the number of similar large regions is a predetermined number or less.

4. The document image processing apparatus according to claim 2, wherein said controller identifies the index candidate region as an index region when the number of similar index candidate regions is a predetermined number or more.

5. The document image processing apparatus according to claim 1, wherein when the index evaluation degree cannot be calculated, the evaluation criterion is changed.

6. The document image processing apparatus according to claim 5, wherein said controller identifies a new formatting property different from the different formatting property, and sets a new evaluation criterion for the new formatting property, as part of the change of the evaluation criterion, and calculates the number of similar index candidate regions and the number of similar large regions based on both the evaluation criterion and the new evaluation criterion.

7. The document image processing apparatus according to claim 1, wherein said different formatting property comprises any one of an indent amount, a justified line, distances from previous and next character string element regions, a character string decoration, a head character kind, an end character kind, a language type, a character size, a line height, a character interval, a font, a character decoration, a character color, and a background color.

8. The document image processing apparatus according to claim 1, further comprising an image reader to read a manuscript to generate said document image, wherein said controller further generates viewing navigation information for specifying a position of said extracted index region in said document image, and generates a computerized document by adding said viewing navigation information to said document image.

9. The document image processing apparatus of claim 1, wherein the apparatus is a multi-function peripheral.

10. The document image processing apparatus of claim 1, wherein the size property is character size or line height.

11. The document image processing apparatus of claim 1, wherein the evaluation criterion is dynamically set with respect to each index candidate region.

12. The document image processing apparatus according to claim 1, wherein the different format property indicates that index candidate region includes one of format properties and the related text region does not include the format property, and the evaluation criterion is the criterion for evaluating whether the format property is existing in the region or not.

13. A document image processing method that extracts an index region from a document image comprising a plurality of character string element regions, the method comprising:

providing a document image processing apparatus comprising a memory for storing the document image and a controller for controlling extraction of an index region from the document wherein said controlling extraction of an index region from the document image comprises:

for each character string element region, identifying the character string element region as a large region or a small region based on a size property of the character string element region;

for each small region, identifying the small region as an index candidate when a region immediately following the small region is a large region, and identifying the large region immediately following the index candidate region as a related text region;

for each index candidate region, comparing formatting of the index candidate region to formatting of the related text region and identifying a formatting property that is different between the index candidate region and the related text region as a different formatting property;

for each index candidate region, setting an evaluation criterion such that a value of the index candidate region for the different formatting property satisfies the evaluation criterion and a value of the related text region for the different formatting property does not satisfy the evaluation criterion;

for each index candidate region:

setting the index candidate region as the focused index candidate region and setting the different formatting property of the focused index candidate region as the focused different formatting property;

for each index candidate region that is not the focused index candidate region, identifying the value of the index candidate region for the focused different formatting property;

calculating, as a number of similar index candidate regions, a total number of index candidate regions that satisfy the evaluation criterion for the focused different formatting property;

for each large region, identifying the value of the large region for the focused different formatting property;

calculating, as a number of similar large regions, a total number of large regions that satisfy the evaluation criterion for the focused different formatting property;

calculating an index evaluation degree based on the number of similar index candidate regions and the number of similar large regions;

identifying index regions from among the index candidate regions based on the index evaluation degree of each index candidate region.

14. The document image processing apparatus according to claim 13, wherein the different format property indicates that index candidate region includes one of format properties and the related text region does not include the format property, and the evaluation criterion is the criterion for evaluating whether the format property is existing in the region or not.

15. The document image processing apparatus according to claim 13, wherein said different formatting property comprises any one of an indent amount, a justified line, distances from previous and next character string element regions, a character string decoration, a head character kind, an end character kind, a language type, a character size, a line height, a character interval, a font, a character decoration, a character color, and a background color.

16. A non-transitory computer-readable recording medium having a recorded document image processing program for use with a document image comprising a plurality of character string element regions that, when executed by a computer, causes the computer to perform:

for each character string element region, identifying the character string element region as a large region or a small region based on a size property of the character string element region;

for each small region, identifying the small region as an index candidate when a region immediately following the small region is a large region, and identifying the large region immediately following the index candidate region as a related text region;

for each index candidate region, comparing formatting of the index candidate region to formatting of the related text region and identifying a formatting property that is different between the index candidate region and the related text region as a different formatting property;

for each index candidate region, setting an evaluation criterion such that a value of the index candidate region for the different formatting property satisfies the evaluation criterion and a value of the related text region for the different formatting property does not satisfy the evaluation criterion;

for each index candidate region:
- setting the index candidate region as the focused index candidate region and setting the different formatting property of the focused index candidate region as the focused different formatting property;
- for each index candidate region that is not the focused index candidate region, identifying the value of the index candidate region for the focused different formatting property;
- calculating, as a number of similar index candidate regions, a total number of index candidate regions that satisfy the evaluation criterion for the focused different formatting property;
- for each large region, identifying the value of the large region for the focused different formatting property;
- calculating, as a number of similar large regions, a total number of large regions that satisfy the evaluation criterion for the focused different formatting property;
- calculating an index evaluation degree based on the number of similar index candidate regions and the number of similar large regions;
- identifying index regions from among the index candidate regions based on the index evaluation degree of each index candidate region.

17. The document image processing apparatus according to claim 16, wherein the different format property indicates that index candidate region includes one of format properties and the related text region does not include the format property, and the evaluation criterion is the criterion for evaluating whether the format property is existing in the region or not.

18. The document image processing apparatus according to claim 16, wherein
said different formatting property comprises any one of an indent amount, a justified line, distances from previous and next character string element regions, a character string decoration, a head character kind, an end character kind, a language type, a character size, a line height, a character interval, a font, a character decoration, a character color, and a background color.

* * * * *